(12) United States Patent
Kool et al.

(10) Patent No.: US 10,673,288 B2
(45) Date of Patent: Jun. 2, 2020

(54) METHOD FOR FORMING A NITROGENATION BARRIER AND MACHINE FORMED USING A BODY HAVING THE NITROGENATION BARRIER

(71) Applicant: General Electric Company, Schenectady, NY (US)

(72) Inventors: Lawrence Bernard Kool, Niskayuna, NY (US); Min Zou, Niskayuna, NY (US); Wanming Zhang, Niskayuna, NY (US); Susan Corah, Niskayuna, NY (US); Christopher Klapper, Niskayuna, NY (US); Francis Johnson, Niskayuna, NY (US); Steve Buresh, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 102 days.

(21) Appl. No.: 15/895,743

(22) Filed: Feb. 13, 2018

(65) Prior Publication Data
US 2018/0183279 A1 Jun. 28, 2018

Related U.S. Application Data

(63) Continuation-in-part of application No. 15/078,516, filed on Mar. 23, 2016, now Pat. No. 10,229,777, and
(Continued)

(51) Int. Cl.
*H02K 1/02* (2006.01)
*H02K 1/04* (2006.01)
(Continued)

(52) U.S. Cl.
CPC ............... *H02K 1/04* (2013.01); *B32B 15/01* (2013.01); *C22C 38/001* (2013.01); *C22C 38/06* (2013.01);
(Continued)

(58) Field of Classification Search
CPC .......... H02K 1/04; H02K 15/12; H02K 15/02; H02K 1/02; H01F 1/344; H01F 2003/106;
(Continued)

(56) References Cited

U.S. PATENT DOCUMENTS

| 5,376,188 A | 12/1994 | Tahara et al. |
| 5,900,126 A | 5/1999 | Nelson et al. |

(Continued)

FOREIGN PATENT DOCUMENTS

JP 2015053823 A 3/2015

OTHER PUBLICATIONS

"Why is O2 Paramagnetic while N2 Diamagnetic", http://www.idc-online.com, Sep. 2014.*

(Continued)

*Primary Examiner* — John K Kim
(74) *Attorney, Agent, or Firm* — Christopher R. Carroll; The Small Patent Law Group LLC

(57) ABSTRACT

A method includes forming one or more oxide barrier layers on one or more protected portions of a magnetic, metallic body, and converting one or more unprotected portions of the magnetic, metallic body to a less magnetic material by exposing the magnetic metallic body having the one or more oxide barrier layers formed thereon to nitrogen. One or more protected portions of the magnetic, metallic body that are beneath the one or more oxide barrier layers are not converted to the less magnetic material. The method can be used to form one or more layers of a laminated electric motor.

17 Claims, 10 Drawing Sheets

Related U.S. Application Data a continuation-in-part of application No. 14/068,937, filed on Mar. 23, 2016, now Pat. No. 10,229,776, which is a continuation-in-part of application No. 14/068,937, filed on Oct. 31, 2013, now Pat. No. 9,634,549, said application No. 15/078,516 is a continuation-in-part of application No. 14/068,937, filed on Oct. 31, 2013, now Pat. No. 9,634,549.

(51) Int. Cl.

| | | |
|---|---|---|
| *H02K 15/02* | (2006.01) | |
| *H02K 15/12* | (2006.01) | |
| *H01F 1/34* | (2006.01) | |
| *H01F 3/02* | (2006.01) | |
| *H01F 41/02* | (2006.01) | |
| *C22C 38/00* | (2006.01) | |
| *C22C 38/54* | (2006.01) | |
| *C22C 38/06* | (2006.01) | |
| *B32B 15/01* | (2006.01) | |
| *C22C 38/30* | (2006.01) | |
| *C22C 38/58* | (2006.01) | |
| *C22C 38/38* | (2006.01) | |
| *H01F 3/10* | (2006.01) | |

(52) U.S. Cl.
CPC .............. *C22C 38/30* (2013.01); *C22C 38/38* (2013.01); *C22C 38/54* (2013.01); *C22C 38/58* (2013.01); *H01F 1/344* (2013.01); *H01F 3/02* (2013.01); *H01F 41/0233* (2013.01); *H02K 1/02* (2013.01); *H02K 15/02* (2013.01); *H02K 15/12* (2013.01); *H01F 2003/106* (2013.01)

(58) Field of Classification Search
CPC ......... C22C 38/58; C22C 38/54; C22C 38/38; C22C 38/30; C22C 38/06; C22C 38/001; B32B 15/01
USPC ...................... 310/44; 148/287, 306; 335/302
See application file for complete search history.

(56) References Cited

U.S. PATENT DOCUMENTS

| | | | |
|---|---|---|---|
| 6,187,664 B1 | 2/2001 | Yu | |
| 6,574,079 B2 | 6/2003 | Sun et al. | |
| 6,781,184 B2 | 8/2004 | Solayappan et al. | |
| 6,784,588 B2* | 8/2004 | DeCristofaro | H01F 1/15366 310/216.065 |
| 6,888,270 B2 | 5/2005 | Reiter, Jr. et al. | |
| 7,652,404 B2 | 1/2010 | El-Refaie et al. | |
| 7,687,334 B2* | 3/2010 | Zou | C30B 1/023 257/E21.133 |
| 7,727,892 B2 | 6/2010 | Morrow et al. | |
| 7,927,937 B2* | 4/2011 | Zou | C30B 1/023 257/E21.133 |
| 8,004,140 B2 | 8/2011 | Alexander et al. | |
| 8,018,110 B2 | 9/2011 | Alexander et al. | |
| 8,179,009 B2 | 5/2012 | Saban | |
| 8,410,656 B2 | 4/2013 | Lokhandwalla et al. | |
| 8,567,040 B2* | 10/2013 | Kubo | G03F 7/70716 29/592.1 |
| 8,659,199 B2* | 2/2014 | Tokoi | H02K 1/2793 310/156.08 |
| 9,000,642 B2 | 4/2015 | Moulin et al. | |
| 9,214,846 B2 | 12/2015 | Fubuki | |
| 9,384,987 B2 | 7/2016 | Jung et al. | |
| 9,634,549 B2* | 4/2017 | Dial | H01F 1/147 |
| 9,803,139 B1* | 10/2017 | Bonitatibus, Jr. | C23F 1/00 |
| 10,020,098 B2* | 7/2018 | Furusawa | B22F 3/003 |
| 2002/0054462 A1 | 5/2002 | Sun et al. | |
| 2003/0003765 A1 | 1/2003 | Gibson et al. | |
| 2012/0126652 A1 | 5/2012 | Shah et al. | |
| 2013/0022833 A1* | 1/2013 | Wakade | C22C 38/004 428/611 |
| 2014/0239763 A1 | 8/2014 | Raminosoa et al. | |
| 2014/0265708 A1 | 8/2014 | Galioto et al. | |
| 2015/0031084 A1* | 1/2015 | Banta | C12P 1/04 435/72 |
| 2015/0179917 A1 | 6/2015 | Greer et al. | |
| 2015/0295454 A1 | 10/2015 | El-Refaie et al. | |
| 2016/0087503 A1 | 3/2016 | Galioto et al. | |
| 2016/0121421 A1 | 5/2016 | Uhm et al. | |
| 2016/0203898 A1 | 7/2016 | Johnson et al. | |
| 2016/0203899 A1 | 7/2016 | Zou et al. | |
| 2017/0183764 A1 | 6/2017 | Dial et al. | |
| 2018/0183279 A1* | 6/2018 | Kool | B32B 15/01 |
| 2018/0337565 A1 | 11/2018 | Reddy et al. | |
| 2019/0279795 A1* | 9/2019 | Zhang | H02K 1/02 |

OTHER PUBLICATIONS

All America Threaded Products, "What is the Difference Between Austenitic, Ferritic, and Martensic Stainless?", webpage, copyright 2017, https://www.aatprod.com/hrf_faq/what-is-the-difference-between-austenitic-ferritic-and-martensic-stainless/ (1 page).

Rawers et al., "Nitrogen Concentration in Fe—Cr—Mn Alloys", Journal of Materials Engineering and Performance, Oct. 1993, pp. 561-658, vol. 2, ASM International (7 pages).

Tsuchiyama et al., "Thermodynamics of Nitrogen Absorption into Solid Solution in Fe—Cr—Mn Ternary Alloys", Materials Science Forum, Aug. 15, 2003, ISSN: 1662-9752, pp. 957-962, vols. 426-432, of Trans Tech Publications (6 pages).

Werner et al., "Energy-efficient steels for motor laminations", Journal of Materials Engineering and Performance, Mar. 1992, pp. 227-234, vol. 1, Issue: 2, (8 pages).

Extended European Search Report for corresponding European Patent Application No. 19156862.5-1212 dated Jun. 27, 2019 (8 pages).

Marcos et al. "Stainless steel patterning by combination of micro-patterning and driven strain produced by plasma assisted nitriding" Surface & Coatings Technology 205 (2011) S275-S279, Jan. 20, 2011 (5 pages).

Shashank et al. "Selective plasma nitridation and contrast reversed etching of silicon" 2001 American Vacuum Society (4 pages).

\* cited by examiner

METHOD FOR FORMING A NITROGENATION BARRIER AND MACHINE FORMED USING A BODY HAVING THE NITROGENATION BARRIER

CROSS-REFERENCE TO RELATED APPLICATIONS

This application is a continuation-in-part of U.S. patent application Ser. No. 15/078,516 (filed 23 Mar. 2016) and is a continuation-in-part of U.S. patent application Ser. No. 15/078,439 (filed 23 Mar. 2016), both of which is a continuation-in-part of U.S. patent application Ser. No. 14/068,937 (filed 31 Oct. 2013, now U.S. Pat. No. 9,634,549). The entire disclosures of these three patent applications are incorporated herein by reference.

STATEMENT REGARDING FEDERALLY SPONSORED RESEARCH OR DEVELOPMENT

This invention was made with Government support under contract number DE-EE0007755 awarded by the Department Of Energy. The Government has certain rights in this invention.

FIELD

The subject matter described herein relates to methods that alter characteristics of materials, such as the magnetism of materials.

BACKGROUND

Characteristics of materials can be changed by doping or otherwise introducing species into the materials. For example, characteristics of metal alloys can be changed by diffusing substances into the metal alloys, such as by diffusing nitrogen into the surface of a metal to create a case-hardened surface.

Nitrogenation can be used to change the magnetic characteristic of a metal. The metal can be exposed to nitrogen, which incorporates at least some of the nitrogen into the metal. The incorporation of the nitrogen can change the metal from a magnetic material to a non-magnetic material, or a material that is less magnetic than prior to exposure to the nitrogen.

Due to diffusion of nitrogen during the nitrogenation process, it can be difficult to control which areas of the metal are exposed to nitrogen. One approach to controlling which areas of the metal receive nitrogen during the nitrogenation process involves applying a ceramic mask to the metal. Locations having the ceramic mask receive little to no nitrogen and, as a result, maintain the magnetic characteristic that the metal had prior to the nitrogenation process. Locations that do not have the ceramic mask receive nitrogen and lose the magnetic characteristic (e.g., these locations are no longer magnetically attracted to magnets, or are less magnetically attracted to magnets). These locations can no longer be ferritic).

But, this ceramic mask can be difficult to remove. The removal can involve chemical and/or mechanical etching of the mask, which can introduce damage to the underlying material. Additionally, this removal operation adds cost and complexity to the process for creating the material having the magnetic areas and non-magnetic areas.

BRIEF DESCRIPTION

In one embodiment, a method includes forming one or more oxide barrier layers on one or more protected portions of a magnetic, metallic body, and converting one or more unprotected portions of the magnetic, metallic body to a less magnetic material by exposing the magnetic metallic body having the one or more oxide barrier layers formed thereon to nitrogen. One or more protected portions of the magnetic, metallic body that are beneath the one or more oxide barrier layers are not converted to the less magnetic material.

In one embodiment, a method includes oxidizing one or more magnetic portions of a metallic body that is a magnetic body, exposing the metallic body to nitrogen such that one or more converted portions of the metallic body are converted into a less magnetic material to form a converted metallic body formed of both the one or more magnetic portions and the one or more converted portions that include the less magnetic material, and incorporating the converted metallic body into a machine without removing the one or more magnetic portions that are oxidized.

In one embodiment, an electric motor includes one or more of a rotor or a stator formed from several metallic layers laminated with each other. The metallic layers include magnetic portions and less magnetic portions, the magnetic portions of the metallic layers including oxide layers disposed on the magnetic portions between the less magnetic portions and an adjacent metallic layer of the metallic layers.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein relate to a magnetic component having variations in nitrogen content and saturation magnetization in different regions of the magnetic component, and a method of varying the saturation magnetization in different regions of the magnetic component.

In some embodiments, a magnetic component is disclosed. The magnetic component described herein includes a first region and a second region, where the first region and the second region are characterized by a nitrogen content that is different from each other.

Figure 1:
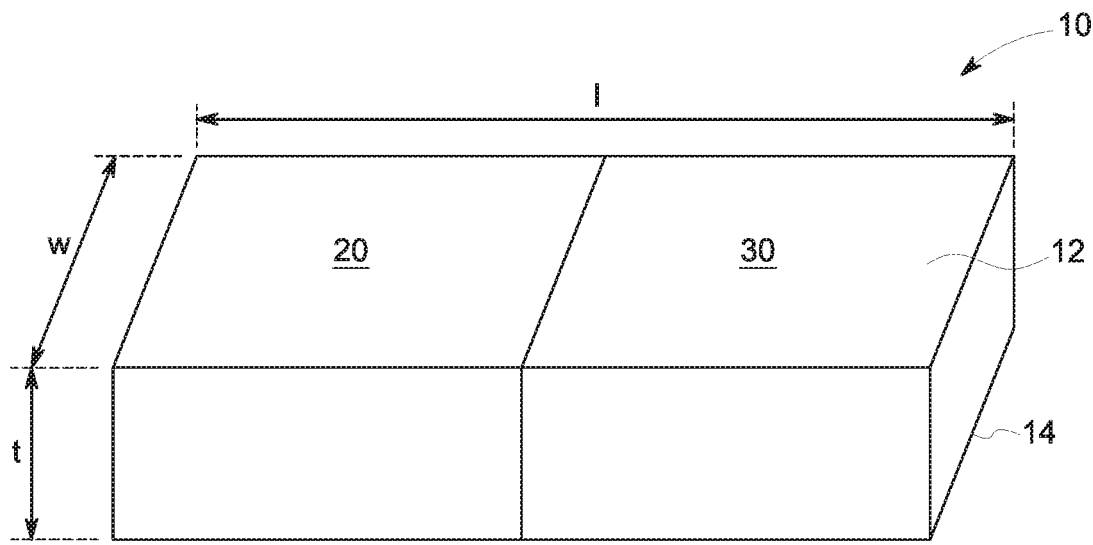
FIG. 1 illustrates a magnetic component including first and second regions, in accordance with some embodiments.

The term "magnetic component" as used herein refers to a magnetic part of any product, such as, for example, a rotor lamination of a motor. In some embodiments, the magnetic component is formed from a ferromagnetic material, in the size and shape required for the final application. FIG. 1 illustrates a magnetic component 10 in accordance with some embodiments. The magnetic component 10 is usually formed from a composition having a carbon concentration less than 0.05 weight %, and may be of any shape and size. For ease of understanding herein, the magnetic component 10 is envisaged as having a rectangular shape having a top surface 12 and a bottom surface 14.

In some embodiments, the magnetic component 10 may have a certain length (l), width (w), and thickness (t). The magnetic component 10 includes two marked regions, a first region 20 and a second region 30, where the first region 20 and the second region 30 are characterized by a nitrogen content that is different from each other. Further, at least one of the first region 20 and the second region 30 is partially-magnetic and has a nitrogen content in a range from about 0.1 weight % to about 0.4 weight % of that region.

Nitrogen content in a region is associated with a magnetism of that particular region. In some embodiments, the magnetism of a region increases with decreasing nitrogen content in that region. Thus, in some embodiments, a region is magnetic if a nitrogen content of that region is less than 0.1 weight % of that region, and a region is non-magnetic if a nitrogen content of that region is greater than 0.4 weight % of that region. Further, a region is partially-magnetic if a nitrogen content is in a range from about 0.1 weight % to about 0.4 weight % of that region.

As used herein, the term "magnetic region" refers to a region where greater than about 99 volume % of the region is magnetic. Further, the term "magnetic region" refers to a region having a relative permeability greater than 1. In some embodiments, the relative permeability of the magnetic region may be greater than 100, and in some embodiments, the relative permeability of the magnetic region may be greater than 200. In some embodiments, a saturation magnetization of the magnetic region is greater than 1.5 Tesla. In certain embodiments, a saturation magnetization of the magnetic region is greater than 1.8 Tesla.

As used herein, the term "non-magnetic region" refers to a region where greater than 90 volume % of the region is non-magnetic. Further, the term "non-magnetic region" refers to a region having a relative permeability approximately equal to 1. In some embodiments, a saturation magnetization of the non-magnetic region is about zero.

As used herein, the term "partially-magnetic region" refers to a region where from about 10 volume % to about 99 volume % of the region is magnetic with a relative permeability greater than 1. In some embodiments, a saturation magnetization of the partially-magnetic phase is in a region from about 0.01 to about 1.5 Tesla. In some embodiments, a saturation magnetization of the partially-magnetic region is in a range from about 0.5 to about 1.5 Tesla.

In some embodiments, the nitrogen content and saturation magnetization in a region are substantially constant across the volume within that region. For example, in some embodiments, a nitrogen content in a magnetic region has a substantially constant value that is less than 0.1 weight % and a saturation magnetization has a substantially constant value that is greater than 1.5 Tesla across the volume of the magnetic region. In some embodiments, a nitrogen content in a non-magnetic region has a substantially constant value that is greater than 0.4 weight % and a saturation magnetization is about zero across the volume of the non-magnetic region. Further, in some embodiments, a nitrogen content in a partially-magnetic region has a substantially constant value that is in a range from about 0.1 weight % to about 0.4 weight % and a saturation magnetization has a substantially constant value that is in a range from about 0.5 Tesla to about 1.5 Tesla across the volume of the partially-magnetic region.

In some embodiments, a nitrogen content of the first region 20 is less than 0.1 weight % of the first region 20, and a nitrogen content of the second region 30 is in the range from about 0.1 weight % to about 0.4 weight % of the second region 30. In some of these embodiments, the first region 20 is magnetic, and the second region 30 is partially-magnetic.

In some embodiments, a nitrogen content of the first region 20 is greater than 0.4 weight % of the first region 20, and a nitrogen content of the second region 30 is in the range from about 0.1 weight % to about 0.4 weight % of the second region 30. In some of these embodiments, the first region 20 is non-magnetic, and the second region 30 is partially-magnetic.

In some embodiments, a nitrogen content of the first region 20 has a substantially constant value in the range from about 0.1 weight % to about 0.4 weight % of the first region 20, and a nitrogen content of the second region 30 has a substantially constant value in the range from about 0.1 weight % to about 0.4 weight % of the second region 30, where the substantially constant values of the first region 20 and the second region 30 are different from each other. In some of these embodiments, both the first region 20 and the second region 30 are partially-magnetic, but are characterized by a nitrogen content that is different from each other.

A magnetic component, according to some embodiments, may include any number of first and second regions of any dimension and shape. In some embodiments, the magnetic component includes a plurality of first and second regions in the vicinity of each other.

Figure 2:
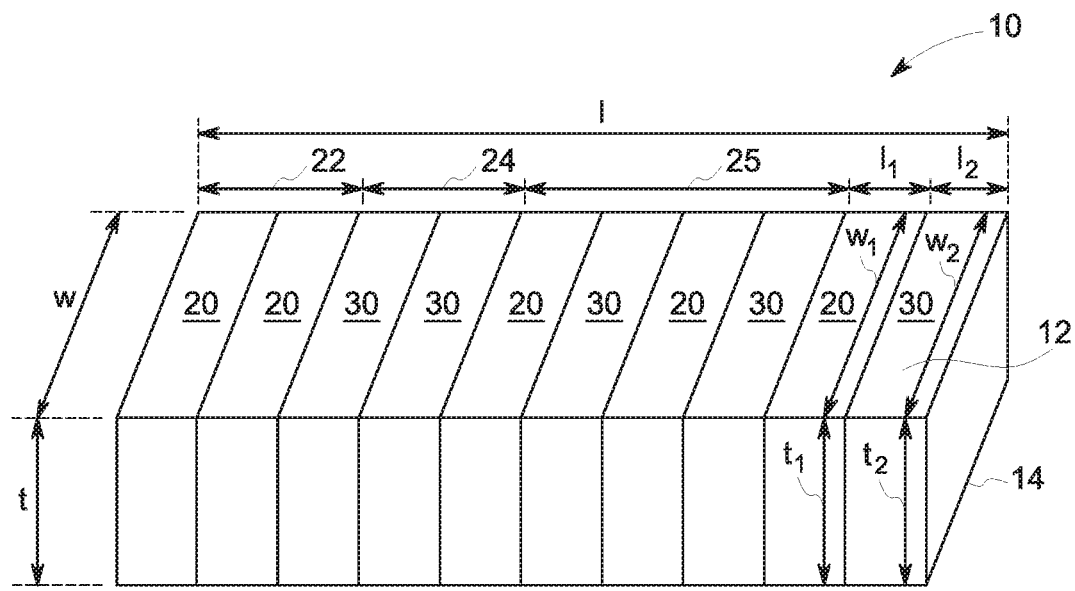
FIG. 2 illustrates a magnetic component including multiple first and second regions, in accordance with some embodiments.

FIG. 2 illustrates a magnetic component 10 in accordance with some embodiments of this disclosure. In some embodiments, as shown in FIG. 2, the magnetic component 10 may include a plurality of first and second regions. In the embodiment illustrated in FIG. 2, the first and second regions are illustrated as being disposed either adjacent to each other, or in an alternating manner. However, embodiments in which the first and second regions are disposed in a random manner throughout the volume of the magnetic component are also within the scope of the present specification. In some of these embodiments, two or more partially-magnetic regions may be disposed next to each other.

Referring again to FIG. 2, the magnetic component 10 includes a first portion 22 including a plurality of first regions 20 disposed adjacent to each other, a second portion 24 including a plurality of second regions 30 disposed adjacent to each other, and a third portion 25 including a plurality of first region 20 and second region 30 disposed in an alternating manner. In some embodiments, the plurality of first regions 20 in the first portion 22 may have similar relative permeability and saturation magnetization values. Similarly, in some embodiments, the plurality of second regions 30 in the second portion 24 may have similar relative permeability and saturation magnetization values.

Further, in some embodiments, a relative permeability of the first region 20 in the third portion 25 may be same as the relative permeability of the first region 20 in the first portion 22, and a saturation magnetization of the first region 20 in the third portion 25 may be same as the saturation magnetization of the first region 20 in the first portion 22. Furthermore, in some embodiments, a relative permeability of the second region 30 in the third portion 25 may be same as the relative permeability of the second region 30 in the second portion 24, and a saturation magnetization of the second region 30 in the third portion 25 may be same as the saturation magnetization of the second region 30 in the second portion 24.

In some other embodiments, a relative permeability of the second region 30 in the third portion 25 may be different from the relative permeability of the second region 30 in the second portion 24, and a saturation magnetization of the second region 30 in the third portion 25 may be different from the saturation magnetization of the second region 30 in the second portion 24. Further, in some embodiments, relative permeabilities of the plurality of second regions 30 in the second portion 24 may be same as, or different from one another, and saturation magnetization of the plurality of second regions 30 in the second portion 24 may be same as, or different from, one another.

In the present disclosure, a particular parameter (for example, nitrogen content, volume % of magnetic region, or a saturation magnetization) for two regions is stated to be different if a difference in the specified value between the two regions is at least 5% of the specified value of any one of the two regions. As used herein the term "difference" refers to a mathematical difference that would be obtained by subtracting a parameter value of one region (for example, the nitrogen content in the first region 20) from the parameter value of another region (for example, the nitrogen content in the second region 30). Thus, in some embodiments, a nitrogen content in the first region 20 and the nitrogen content in the second region 30 is said to be different if the nitrogen content of the first region 20 and the nitrogen content of the second region 30 have a mathematical difference of at least 5% of the nitrogen content of any one of the first region 20 and the second region 30. In some embodiments, the difference between the nitrogen contents of the first and second regions is greater than 10%.

In some embodiments, a saturation magnetization of the first and second regions is said to be different if the saturation magnetization of the first region 20 and the saturation magnetization of the second region 30 have a mathematical difference of at least 5% of the saturation magnetization of any one of the first region 20 and the second region 30. In some embodiments, the difference between the saturation magnetization of the first and second regions is greater than 10%.

It should be noted that FIGS. 1 and 2 are only for illustration purposes, and although the size and shape of the plurality of first and second regions is illustrated to be substantially similar, the shape and size of the regions may vary. For example, the first and second regions, or the first, second, and third portions illustrated in FIG. 2 need not always be along the length (l) of the magnetic component 10, or along the width (w), or thickness (t) of the magnetic component 10. The magnetic component 10 may be designed such that the different first regions 20 may have same or different shapes, length (l1), width (w1), and thickness (t1) values. For example, a shape (not specifically illustrated), length (l1), width (w1), and thickness (t1) of the first region 20 in the first portion 22 may be same as, or different from, the shape, length, width, and thickness respectively, of the first region 20 in the third portion 25.

Further, a shape (not specifically illustrated), length (l2), width (w2), and thickness (t2) of the second region 30 in the second portion 24 may be same as, or different from, the shape, length, width, and thickness respectively, of the second region 30 in the third portion 25. Furthermore, in some embodiments, a shape, length (l2), width (w2), and thickness (t2) of the plurality of second regions 30 in the second portion 24 may be same as, or different from, one another.

Figure 3:
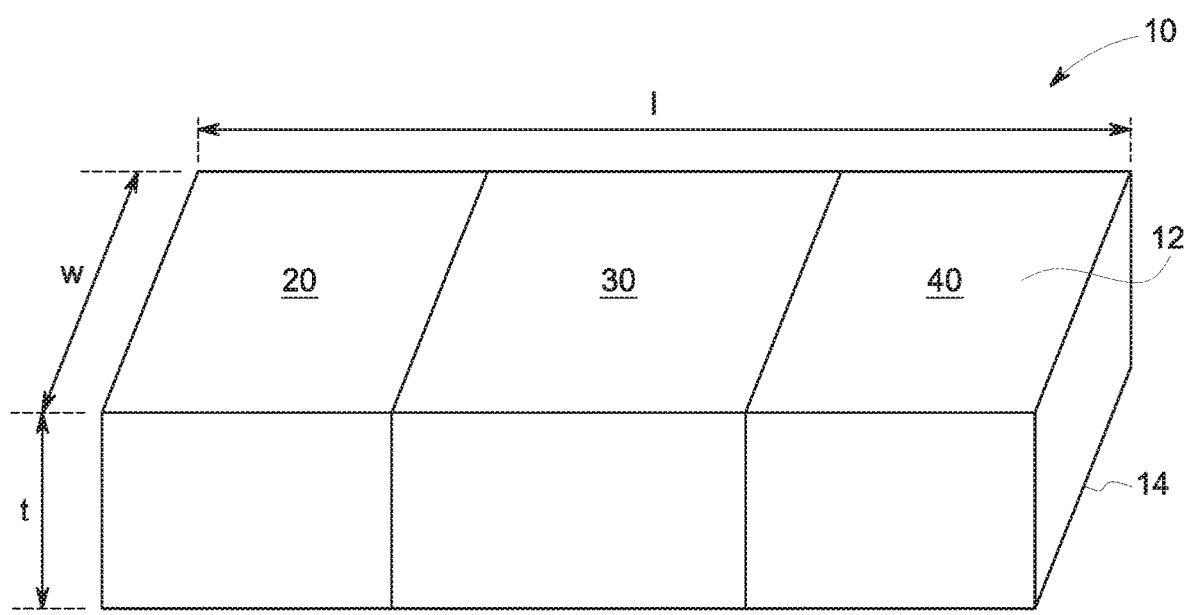
FIG. 3 illustrates a magnetic component including first, second, and third regions, in accordance with some embodiments.

In some embodiments, the magnetic component 10 may further include a third region 40, as illustrated in FIG. 3. The third region 40 is characterized by a nitrogen content that is different from the nitrogen contents of the first and second regions. Thus, in some embodiments, a nitrogen content of the first region 20 is greater than 0.4 weight % of the first region, a nitrogen content of the second region 30 is in the range from about 0.1 weight % to about 0.4 weight % of the second region, and further a nitrogen content of the third region 40 is less than 0.1 weight % of the third region. In some of these embodiments, the first region is non-magnetic, the second region is partially-magnetic, and the third region 40 is magnetic.

In some embodiments, a nitrogen content of the first region 20 is less than 0.1 weight % of the first region, a nitrogen content of the second region 30 is in the range from about 0.1 weight % to about 0.4 weight % of the second region, and a nitrogen content of the third region 40 is greater than 0.4 weight % of the third region. In some of these embodiments, the first region 20 is magnetic, the second region 30 is partially-magnetic, and the third region 40 is non-magnetic. In some embodiments the partially-magnetic region 30 is disposed in between the magnetic region 20 and the non-magnetic region 40, as illustrated in FIG. 3.

Presence of regions of differential saturation magnetization such as magnetic, partially-magnetic, and non-magnetic regions in a motor component may enable precise control of magnetic flux distribution through the volume of an electrical machine. The magnetic flux density within the machine may be highest in magnetic regions, lower in the partially-magnetic regions, and lowest in the non-magnetic regions. Additionally, partially-magnetic and non-magnetic regions may aid in securing the high saturation magnetization regions together and retaining the mechanical integrity of the machine during operation. Further, the presence of multiple regions of different saturation magnetizations distributed throughout the volume of the machine may enable a machine designer to control distribution of magnetic flux within the machine.

In some embodiments, a nitrogen content of both the first region 20 and the second region 30 are in the range from about 0.1 weight % to about 0.4 weight % of the respective regions, where a nitrogen content in the first region 20 is different from the nitrogen content in the second region 30. Further, a nitrogen content of the third region 40 is greater than 0.4 weight % of the third region. In some of these embodiments, the first and second regions are partially-magnetic, and the third region 40 is non-magnetic. In some other embodiments, the first and second regions are partially-magnetic and the third region is magnetic.

A magnetic component 10, according to some embodiments, may have any number of first, second, and third regions of any dimension and shape, in any part of the magnetic component 10. In some embodiments, the first, second, and the third regions may be located adjacent to one another, or may be separated from one another. In some embodiments, the magnetic component may include a plurality of first, second and third regions, corresponding to magnetic, partially-magnetic, and non-magnetic regions respectively, where the partially-magnetic regions are disposed in between the magnetic and non-magnetic regions. In these embodiments, the magnetic and non-magnetic regions are separated from each other, and the partially-magnetic regions are adjacent to magnetic and non-magnetic regions.

In some embodiments, the magnetic component 10 may have a plurality of regions that include at least one partially-magnetic region. Other regions present in the plurality of regions may be magnetic, non-magnetic or partially-magnetic regions. For example, in some embodiments, the plurality of regions may include at least one partially-magnetic region, and at least one magnetic region. In some embodiments, the plurality of regions may include at least one partially-magnetic region, and at least one non-magnetic region. In some embodiments, the plurality of regions may include at least two partially-magnetic regions. In some embodiments, the magnetic component may include at least one magnetic region, at least one partially-magnetic region, and at least one non-magnetic region, as discussed earlier. In some embodiments, the magnetic component 10 is in a monolithic form. As used herein the term "monolithic form" refers to continuous structure substantially free of any joints. In some embodiments, the monolithic magnetic component may be formed as one structure during processing, without any brazing or multiple sintering steps. When the magnetic component is made using a single material, the negative effects of bonding different regions are reduced by ensuring reliability, hermeticity, and increased bond strength of the magnetic component 10.

In some embodiments, a monolithic magnetic component may be manufactured by additive manufacturing. In some embodiments, a magnetic component is manufactured as a monolithic structure, prior to any sintering step. In certain embodiments, the monolithic magnetic component in its entirety is manufactured using a powder having the same composition as the starting material.

Thus, in some embodiments, the magnetic component 10 may be prepared from a single material. As an example, the magnetic component may be prepared from a starting material including a magnetic material. The magnetic material used herein may be a single element, an alloy, a composite, or any combinations thereof. In some embodiments, the magnetic component may include an iron-based alloy in both the first region 20 and the second region 30.

As disclosed earlier, in some embodiments, a nitrogen content in a region within a magnetic component is associated with a magnetism of that particular region. In some embodiments, an association of magnetism of a region with the nitrogen content in that region may vary depending on the composition of the alloy used to form the magnetic component, due to the difference in nitrogen solubility as determined by alloy composition. Thus, in some embodiments, a maximum nitrogen content that can be included in a magnetic region for one ferrous alloy may be different from the maximum nitrogen content that can be included in a magnetic region of another ferrous alloy of different composition. Further, the range of nitrogen contents that may be included to form the partially-magnetic regions in the two ferrous alloys of different compositions may be different and a minimum nitrogen content that can be included to form a non-magnetic region in two different ferrous alloys may vary depending on the compositions of the two ferrous alloys.

In some embodiments, the iron-based alloy may further include chromium, manganese, or a combination thereof. In some embodiments, the iron-based alloy may have a ferrite or martensitic structure. In some embodiments, the iron-based alloy has a composition of 20 weight % chromium and 5 weight % manganese with the balance being substantially iron. In some embodiments, the chromium and manganese concentrations may be between 14 and 20 weight % and between 2 and 5 weight %, respectively, with the balance being iron. In some embodiments, part of the iron may be substituted with up to 35 weight % cobalt. In some embodiments, part of chromium may be substituted with up to 8 weight % aluminum. In some embodiments, part of the iron may substitute with up to 35 weight % cobalt and part of chromium may be substituted with up to 8 weight % aluminum. In some embodiments, the magnetic region of this alloy has a nitrogen content less than 0.1 weight % of that region, a non-magnetic region has a nitrogen content that is greater than 0.4 weight % of that region, and a partially-magnetic region has a nitrogen content in a range from about 0.1 weight % to about 0.4 weight % of that region. As discussed previously, conversion of ferrite or martensitic structures into an austenite increases non-magnetic and partially-magnetic phases in this alloy.

Austenite, also known as gamma phase iron (y-Fe), is a metallic, paramagnetic allotrope of iron. Heating the iron, iron-based metal, or steel to a temperature at which it changes crystal structure from ferrite to austenite is called austenitization. In some embodiments, austenitization may be carried out by adding certain alloying elements. For example, in some embodiments, addition of certain alloying elements, such as manganese, nickel, and carbon, may stabilize the austenitic structure even at room temperature. A selected region may be made partially-magnetic by stabilizing austenite at room temperature at parts of the selected region. Further, a multi-phase magnetic component may be formed by stabilizing austenite at room temperature, in some regions of the magnetic component, while retaining some of the strongly ferromagnetic martensite or ferrite phases at some other regions of the magnetic component.

The presence of carbon is known to stabilize the non-magnetic austenite structure. Earlier efforts had been directed at dissolving formed carbides in selected regions of the magnetic component to stabilize non-magnetic phases at those regions of the magnetic component. In some embodiments, a partially-magnetic region of the magnetic component is formed by stabilizing a low permeability austenite structures, by the addition of nitrogen, rather than carbon. Carbides, as second phases, are known to be undesirable for the magnetic component. Thus, in some embodiments, the magnetic component is substantially free of carbon.

However, in other embodiments of the disclosure, the magnetic component may contain a relatively small level of carbon, which can sometimes increase the tensile strength of the magnetic component. In these embodiments, the total amount of carbon in all regions of the magnetic component may be less than about 0.05 weight %. In some embodiments, as described above, the magnetic component 10 has a first region and a second region, where the first region and the second region are characterized by a nitrogen content that is different from each other. In some embodiments, a concentration of carbon in the first region 20 and the second region 30 of the magnetic component 10 is less than 0.05 weight % of that respective region.

In some embodiments, a method of manufacturing a magnetic component 10 is disclosed. Thermodynamic and empirical calculations may be used to predict magnetic component 10 compositions that upon the addition of nitrogen at elevated temperatures to form the austenite phase. A magnetic component 10 using the designed alloy composition may be manufactured by using the traditional methods. In some embodiments, the magnetic component thus manufactured, in a near-final form, is subjected to selective nitriding, without the need to substantially alter the shape and size of the formed magnetic component after nitriding. As used herein the term "selective nitriding" is the controlled nitriding of some (desired) regions of the magnetic component, without substantially altering the ferromagnetic nature of the nearby regions. The ferromagnetic nature of a nearby region may be considered to be "substantially altered", if the average saturation magnetization of that region is reduced by more than about 5 volume % of that region.

The magnetic component may be engineered to have nitrogen solubility, prior to nitriding, and regions of different saturation magnetization may be realized by selective nitriding. The saturation magnetization of the final magnetic component may be a fraction of the saturation magnetization of the magnetic component before the step of nitriding. The saturation magnetization may differ throughout the volume of the final magnetic component due to localized variations in the processing conditions of the material.

The selective nitriding of the magnetic component may be attained by using different methods of nitriding. A chemical, physical, or mechanical block may be provided to the regions of the magnetic component where the nitriding is not desirable, to retain the magnetism. For example, a chemical composition that discourages nitrogen diffusion into the magnetic component may be used as the "nitrogen stop-off" material at some regions. A physical method of selectively introducing the nitrogen at selected regions, while making the nitrogen unavailable for the other regions, may be used. A mechanical block may be able to mechanically prevent the diffusion of the nitrogen at certain regions.

Thus, in some embodiments, a method of varying the (saturation) magnetization values in different regions of a magnetic component is presented. The method includes disposing a coating that includes a nitrogen stop-off material on at least one portion of the component to form a mask, and heat-treating the component in a nitrogen-rich atmosphere to form the first and second regions. The temperature of heat-treatment may be greater than 700° C. As used herein the term "nitrogen stop-off material" refers a material that is capable of substantially stopping the nitrogen from entering into that region. It is not necessary that the stop-off material itself contain nitrogen. As the method includes selective introduction of nitrogen to first and second regions, the first region and the second region are characterized by a nitrogen content that is different from each other. Further, the introduction of nitrogen to the first and second regions is controlled such that at least one of the first and second regions is partially-magnetic and has a nitrogen content in a range from about 0.1 weight % to about 0.4 weight % of that region.

In some embodiments, a stencil may be used over the magnetic component to block some regions and expose other regions for the coating of nitrogen stop-off material. The coating material may be disposed on the magnetic component by using different methods. Non-limiting examples of methods for disposing the coating on the magnetic component may include dip coating, spray coating, spin coating, slip casting, tape casting and lamination, and gel casting. In certain embodiments, the coating is disposed by spray coating a nitrogen stop-off material in a slurry form over the magnetic component.

In some embodiments, regions that are designed to be partially-magnetic are masked by the coating such that a controlled, partial diffusion of nitrogen is permitted. In some embodiments, regions that are designed to be magnetic are masked such that nitrogen diffusion to those regions is avoided. Further, in some embodiments, the regions that are designed to be non-magnetic remain unmasked such that nitrogen diffuses into those regions.

Thus, by way of example, if it is desired that the first region of the magnetic component is magnetic and have nitrogen content less than 0.1 weight %, the second region is partially-magnetic with the nitrogen content in a range from about 0.1 weight % to about 0.4 weight %, and the third region is non-magnetic with the nitrogen content greater than 0.4 weight %, the coating may be disposed on the first region and the second region. It should be noted that to achieve a partially-magnetic region, a coating may be disposed on that particular region similar to the magnetic region, however, a coating parameter may be varied to achieve the desired nitrogen levels.

Therefore, in some embodiments, the difference in nitrogen content of the first region 20 and the second region 30 of the magnetic component 10 is achieved by varying a coating parameter. The coating parameter includes, but is not limited to, one or more of a coating thickness, a coating density, and a surface coating area percentage. The variation in these coating parameters may be achieved by different methods. In some embodiments, the coating parameters may be varied by controlling a deposition parameter used for disposing the coating. Suitable deposition parameters, include, but are not limited to, deposition methods, material composition, solid loading, density, thickness of as-deposited coating, speed of deposition, drying methods, drying speed, sintering temperature, time, and coating atmosphere.

For example, in certain embodiments, difference in nitrogen content of the first region and the second region is achieved by disposing a coating having a variable thickness. Thus a thickness of the coating in the first region may be varied from the thickness of the coating in the second region, during the deposition itself, so that the nitrogen diffusion into the magnetic component through the masked surface is different in the first and second regions.

Figure 4:
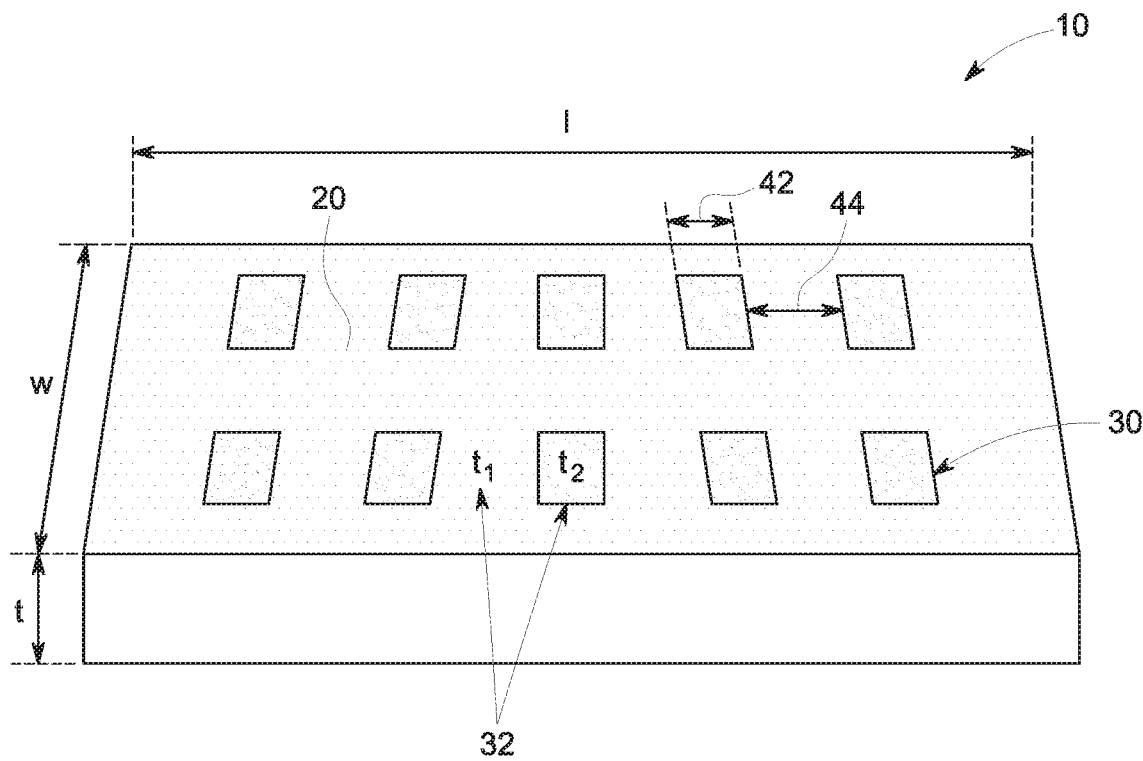
FIG. 4 illustrates a configuration of masks in a magnetic component, that may be used by the methods described herein, in accordance with some embodiments.

In some embodiments, as illustrated in FIG. 4, the first and second regions of the component 10 are masked such that a portion of the magnetic component 10 corresponding to first region 20 is masked by a coating 32 with a thickness t1 to stop the nitrogen diffusion, and a portion of the magnetic component 10 corresponding to the second region 30 is masked by the coating 32 with a lower thickness t2, such that a calculated amount of nitrogen is permitted to diffuse into the second region 30. In these embodiments, the first region 20 is designed to be magnetic, and the second region 30 is designed to be partially-magnetic.

In some embodiments, the thickness t2 of the coating 32 may be controlled such that different portions of the second region 30 have different nitrogen level and different volume % of magnetic regions upon nitriding.

Figure 5:
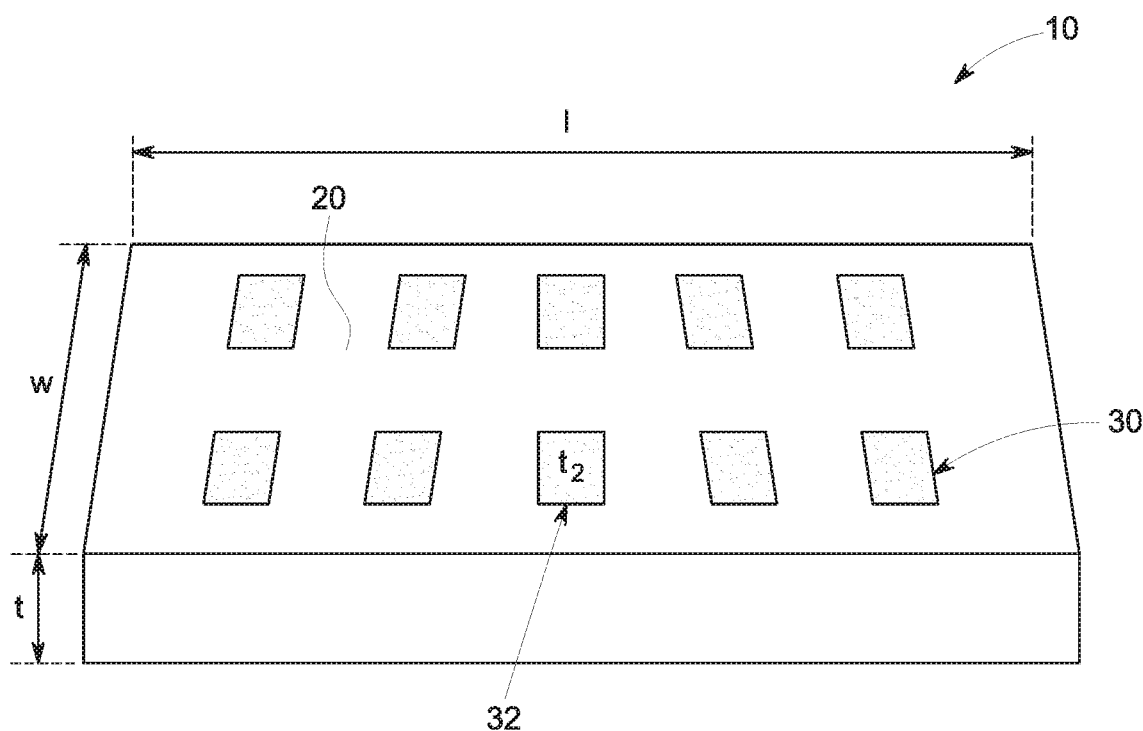
FIG. 5 illustrates a configuration of masks in a magnetic component, that may be used by the methods described herein, in accordance with some embodiments.

Turning now to FIG. 5, in some embodiments, a mask of the nitrogen stop-off material on the magnetic component may be designed such that a portion of the magnetic component 10 corresponding to the first region 20 is unmasked and a portion of the magnetic component 10 corresponding to the second region 30 is masked with the coating 32 of a thickness t2. The unmasked portion permits the nitrogen to diffuse through the magnetic component 10, making the first region 20 non-magnetic, and the masked portion with the coating 32 of thickness t2 allows a partial diffusion of the nitrogen, thus rendering the second region 30 partially-magnetic. One skilled in the art would understand that depending on the shape and size of the required magnetic, partially-magnetic, and non-magnetic regions, the masks may be designed to have different shapes and characteristics.

As discussed above, in some embodiments, instead of varying thickness of the coating, a density or surface coating area percentage of the coating may be varied to control the diffusion of the nitrogen. For example, a coating having a lower density may allow higher amount of nitrogen to diffuse through, as compared to a dense coating. Further, if a surface coating area percentage (alternately percentage of area covered by the coating) of the first region 20 is lower than a surface coating area percentage of the second region 30, a greater amount of nitrogen may diffuse in to the first region 20. In some embodiments, the difference in nitrogen content of the first region 20 and the second region 30 is achieved by selectively removing portions of the coating in one of the regions before the step of heat-treating, thus varying the surface coating area percentage or density of the coating in those regions. Portions of the coating may be selectively removed by different methods including, but not limited to, etching and grit blasting.

As noted earlier, in some embodiments, both the first region 20 and the second region 30 may be partially-magnetic. In such embodiments, the two regions may be formed in the magnetic component for example, by disposing coatings of different thickness, density, or surface coating area percentage in the first and second regions, or by selectively removing the coating partially in one of the regions. In certain embodiments, the magnetic component 10 may include three different regions, such that the first region 20 is magnetic, the second region 30 is partially-magnetic, and the third region 40 is non-magnetic, as shown in FIG. 3. In these embodiments, the first region may be masked with a coating having the desired thickness, density, and surface area coverage that the nitrogen is blocked from entering into the first region. The second region may be partially blocked by varying one or more of the thickness, density, and surface coating area percentage of a coating, to permit the desired amount of nitrogen diffusion into the second region 30. The third region may be completely uncoated to allow maximum nitrogen diffusion into the third region 40. Thus, in such embodiments, the nitridation may be controlled such that the first region 20 has a nitrogen content less than 0.1 weight % of the first region 20, the second region 30 has a nitrogen content in a range from about 0.1 weight % to about 0.4 weight % of the second region 30, and the third region 40 has a nitrogen content greater than 0.4 weight % of the third region 40. Further, a concentration of carbon in the first, second, and third regions may be controlled to be less than 0.05 weight % of the respective regions.

Nitriding may be carried out through a solid, liquid, gaseous, or plasma route. In some embodiments, elevated temperature gas nitriding is used to introduce nitrogen to the part. In certain embodiments, the elevated temperature gas nitriding includes heat-treating the magnetic component in a nitrogen atmosphere at an elevated temperature. Alternately, heat treatment in a mixture of ammonia and hydrogen may be used for nitrogen diffusion. The elevated temperatures in this technique allow for fast diffusion of nitrogen, providing a quick processing route. In some embodiments, heat treatment in a molten salt bath containing cyanides, cyanates, or a combination thereof may be used for nitrogen diffusion. In some embodiments, plasma nitriding may be used for the nitrogen diffusion.

In some embodiments, nitrogen may be diffused into the magnetic component 10 through gas nitriding in a nitrogen-rich atmosphere, by heat-treating at a temperature greater than 700 degrees Celsius (° C.). In some embodiments, gas nitriding is conducted by heat-treating at a temperature greater than 800° C.

In some embodiments, pressure used for gas nitriding is greater than 0.5 atmospheres (atm.). Generally, the diffusion of nitrogen is expected to increase with a higher heat-treatment temperature, and an increased equilibrium surface concentration of nitrogen. The increased pressure of the gases surrounding the magnetic component 10 often leads to an increased surface concentration of nitrogen. Therefore, at a given condition in a pure nitrogen atmosphere, a nitrogen pressure greater than the atmospheric pressure and a high temperature will generally provide a faster nitriding process. In some embodiments, an ambient pressure of greater than 1 atm. and a temperature greater than about 900° C. is used for nitriding. In a further embodiment, the temperature of nitriding is greater than 1000° C.

Figure 6:
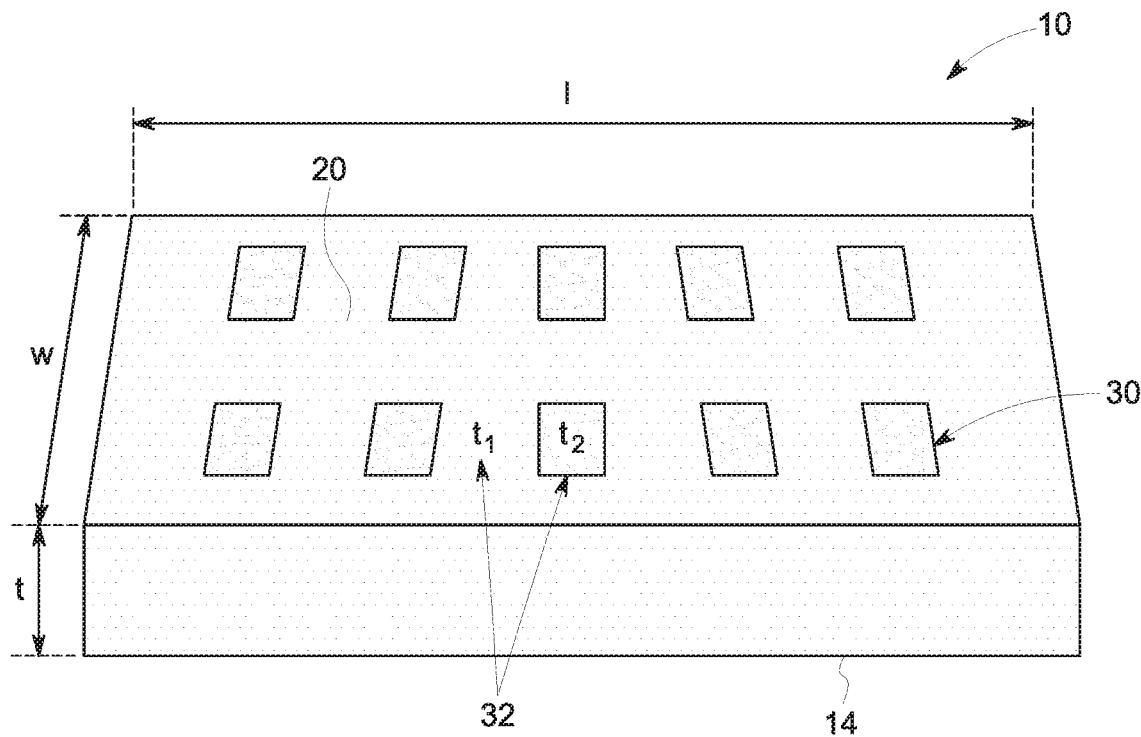
FIG. 6 illustrates a configuration of masks in a magnetic component, that may be used by the methods described herein, in accordance with some embodiments.
Figure 7:
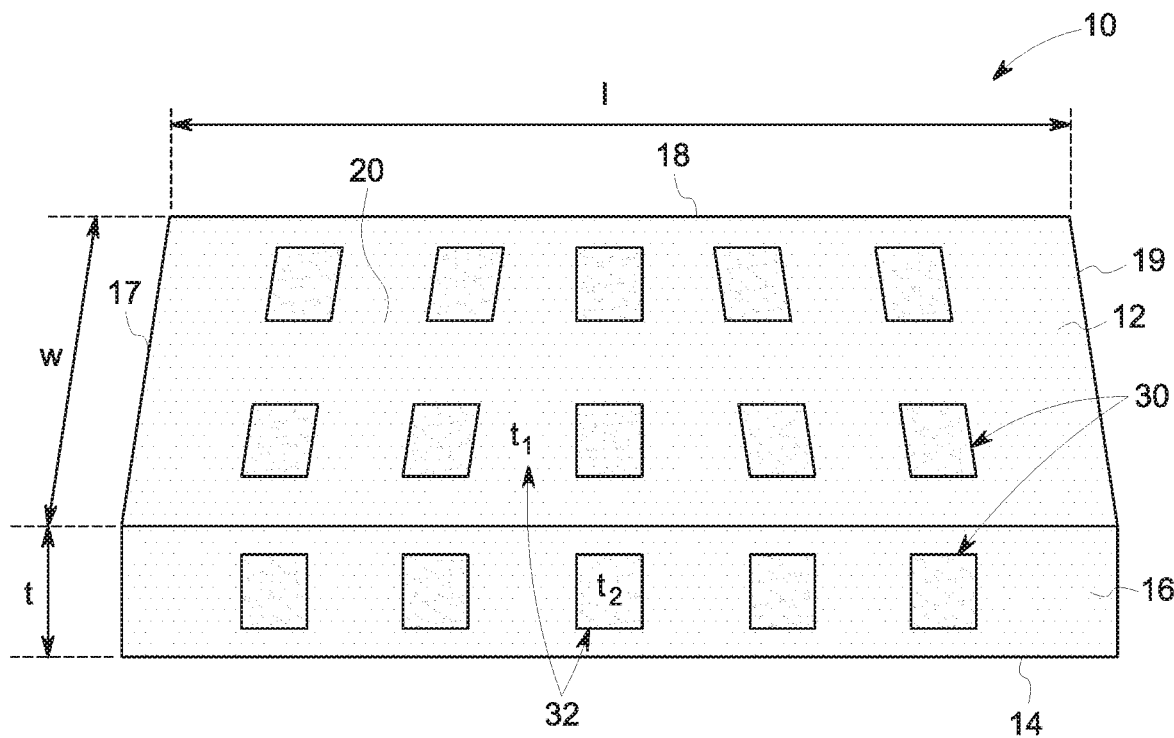
FIG. 7 illustrates a configuration of masks in a magnetic component, that may be used by the methods described herein, in accordance with some embodiments.

In some embodiments, a nitrogen-rich atmosphere is used for nitriding. In some embodiments, the nitrogen-rich atmosphere includes greater than 90% of nitrogen. In some embodiments, nitriding is conducted in a substantially pure nitrogen atmosphere. The substantially pure nitrogen atmosphere may be created by filling nitrogen in a furnace cavity after evacuating the air from the furnace cavity, and purging with nitrogen or through the continuous flow of nitrogen during processing. The coating may be applied on the component depending on the desired pattern of nitrogen diffusion (and non-diffusion) for the magnetic component 10. For example, in FIG. 6, the coating 32 with thickness t1 is disposed on all surface portions of the magnetic component 10 corresponding to the different first regions 20, and the surface portion of the second region 30 is partially coated with the coating 32 having a thickness t2 that is less than t1. The coating 32 with the lower thickness t2 is designed to permit partial diffusion of nitrogen during nitriding. The coating 32 with thickness t2 corresponding to the second region 30 is disposed on the top surface 12 and the bottom surface 14 (coating is not explicitly shown in the bottom surface 14) portions. In these embodiments, the nitridation of the magnetic component 10 occurs only through the partially coated surface portions of the second region 30 on the top surface 12 and the bottom surface 14. Turning now to FIG. 7, the front and back surfaces 16 and 18 through the thickness t of the magnetic component 10 further include partially coated surface portions of the second regions 30, and hence the nitridation of the magnetic component 10 in FIG. 7 may occur through the surface portion of the second regions 30 on the top 12, bottom 14, and the front 16 and rear 18 surface portions of the magnetic component 10.

When the magnetic component 10 illustrated in FIG. 7 is subjected to gas nitriding, the nitrogen diffuses through the component, through uncoated, if any, and partially coated portions of all the faces of the component 10, including the top surface 12, bottom surface 14, and side surfaces 16, 17, 18 and 19 of the magnetic component. This diffused nitrogen, in conjunction with the composition of the magnetic component, changes the local phase stability in those regions, and converts those regions into non-magnetic austenite. Even though the nitrogen diffuses through the surface, the nitriding parameters allow the nitrogen to diffuse further into the length, width, and thickness of the magnetic component, through all the surfaces of the magnetic component 10, while the masked or partially masked regions prevent substantial nitrogen diffusion through those regions.

Through empirical and thermodynamic calculations, the parameters of nitriding may be adjusted, and the nitrogen diffusion at different directions may be predicted for certain regions of the magnetic component 10, and accordingly, the mask size and shape may be altered so that the end product obtained is approximately the desired outcome of the nitriding process.

In some embodiments, the nitrogen diffusion into interior regions of the magnetic component may depend on the distance nitrogen travels inside the magnetic component 10. For example, if the nitridation is only through the top and bottom surfaces 12, and 14 respectively, as shown in FIG. 6, the time duration required for the nitrogen diffusion into the inner parts of the magnetic component 10 may depend on the thickness t of the magnetic component 10. In some embodiments, the thickness of the magnetic component 10 is in a range from about 0.1 mm to about 5 mm. The desired pattern of the magnetic, non-magnetic, and partially-magnetic regions of this component may be obtained by diffusing the nitrogen through the selectively masked top surface 12 and bottom surface 14, keeping the side surfaces of the thickness t completely masked.

Width 42 (as shown in FIG. 4) of the mask of the partially-masked second region 30 is the dimension between first regions 20, and may be designed as per the requirement of the magnetic component 10. In some embodiments, a width 44 of each of the first regions 20 in the surface is greater than about 0.5 mm. In a further embodiment, a width of each of the first regions 20 in a plane perpendicular to the thickness t is greater than about 0.5 mm. (As previously explained in FIG. 1, the dimension "w" represents the overall width of the magnetic component 10.)

Figure 8:
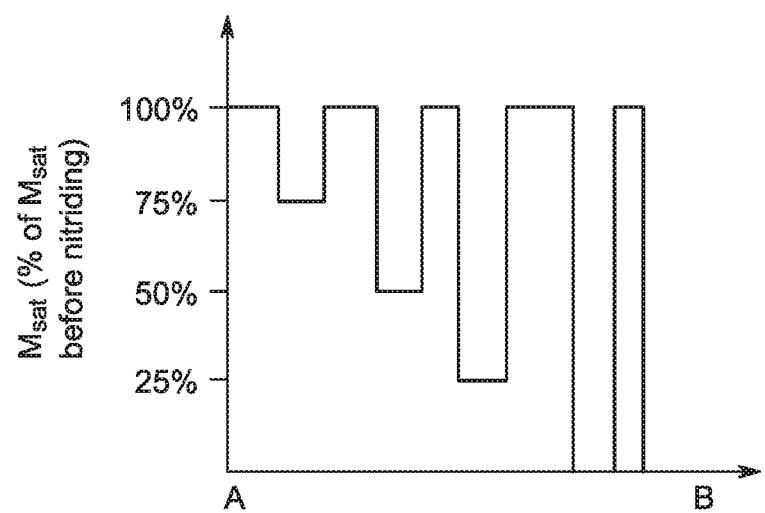
FIG. 8 schematically illustrates saturation magnetization values of a multi-phase magnetic component that may be obtained, in accordance with some embodiments.

FIG. 8 schematically illustrates a hypothetical variation of saturation magnetization (MSat) of a portion of magnetic component 10 along a direction from A to B. As used herein, the saturation magnetization MSat of particular regions are presented as a percentage of the saturation magnetization of that particular region before nitriding.

Depending on the applications, the shape of the magnetic, partially-magnetic, and non-magnetic regions may vary, and the diffusion of nitrogen may be designed to satisfy these requirements. Accordingly, in some embodiments, a volume percent of the partially-magnetic region in the surface and interior portions of a magnetic component 10 is equal to or greater than the volume percent of the magnetic or non-magnetic regions in the surface and interior portions. In some embodiments, partially-magnetic regions of the magnetic component have an interconnected geometry, regardless of the difference in saturation magnetization of different portions of the partially-magnetic region. The "interconnected geometry" as used herein implies that a region is connected all through the component, and is hence not isolated completely from the similar regions, being surrounded by the other regions completely.

Different topologies may include multi-phase magnetic materials described above and an electrical machine including a magnetic component as described above may be manufactured. For example, internal permanent magnet machines, and induction machines may be designed with higher power density and improved power factor, and reduced torque ripple through pole shaping, and may be designed to have sensorless control. Switched reluctance machines may be designed to have lower windage losses at high speeds and further to reduce torque ripple. Synchronous reluctance machines may be designed to have higher power density, improved power factor, wider constant power speed range, lower torque ripple, and sensorless control.

Figure 9:
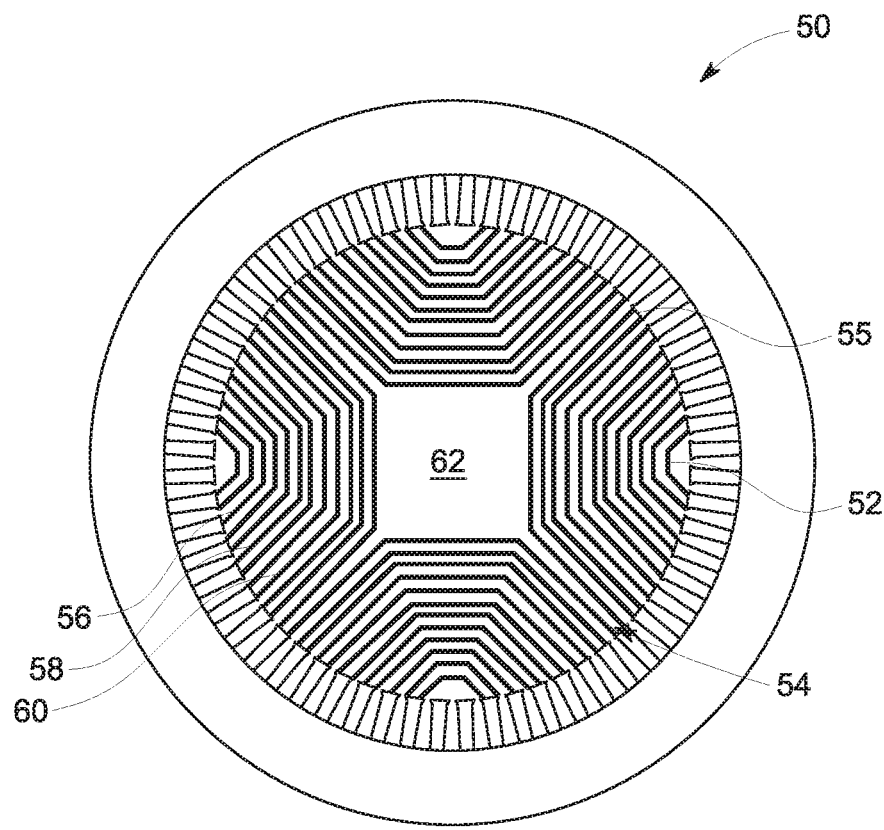
FIG. 9 illustrates a cross-sectional view of a multi-phase component prepared using the methods described herein, in accordance with some embodiments.

For example, a number of different types of synchronous reluctance machines, including a stator and a rotor shaft operationally disposed within the confines of the stator may be designed. FIG. 9 illustrates an example of a topology that could benefit from the multi-phase materials. The component 50 can represent a portion of the reluctance machine, including a magnetic region 52 and a partially-magnetic region 54, collectively referred to as "laminated segments" below. The selectively shaped rotor 55 of the component 50 is configured as a four-pole machine. Each pole can include a plurality of the axially-extending, radially positioned ("stacked") laminated segments 56, 58, 60, and the like, which extend from each pole, terminating at a central rotor shaft 62. The number of poles, and the number of laminations, can vary greatly, depending on the particular design of the reluctance machine.

With continued reference to FIG. 9, the laminated segments effectively guide the magnetic flux into and out of the rotor 55. The magnetic regions 52 constrain the path of the magnetic flux, while the partially-magnetic regions 54 ensure a relatively high density of magnetic flux lines coming out of the surface of the rotor, and going into an air gap between the rotor and the stator. In manufacturing these types of reluctance machines according to conventional techniques, magnetic and partially-magnetic laminations usually had to be assembled by various mechanical/metal-working steps, e.g., cutting and welding. Inventors of the present application have discovered that the desired configurations of the machines obtained much more efficiently using the multi-phase materials and methods for making these, as described in some embodiments.

Different embodiments presented herein may enable a motor designer to precisely control the distribution of magnetic flux through the volume of an electrical machine. This may be achieved by designing regions of differential saturation magnetization distributed throughout the volume of the machine. The magnetic flux density within the machine will be high in those regions which have higher saturation magnetization. Regions of lower saturation magnetization will still be available to retain the mechanical integrity of the machine. Thus, in some embodiments, the low magnetization regions may be used to fasten together the high saturation magnetization regions during rotation of a machine in operation.

One or more additional embodiments of the inventive subject matter described herein provide methods for forming a nitrogenation barrier on a magnetic body, and a machine that includes the magnetic body having the nitrogenation barrier.

Some machines, such as magnetic motors, rely on the ability to mask portions of a laminate material used to form the machines so that masked portions of the laminate material are not converted to a non-ferritic (e.g., non-magnetic or less magnetic) composition during a nitrogenation step. For example, different areas of a metal body (e.g., a plate) can have a nitrogenation barrier applied to the areas to prevent nitrogen from diffusing into the metal body in the areas. These areas remain magnetic or ferritic (e.g., these areas are magnetically attracted to magnets). The other areas of the metal body not having the nitrogenation barrier receive at least some nitrogen during the nitrogenation process, which converts these areas to a non-ferritic composition that is not magnetically attracted to magnets. Optionally, these non-ferritic composition areas may still be magnetic, but significantly less magnetic. For example, the magnetic force between a magnet and the areas of the metal body having the nitrogenation barrier may be twice, three times, five times, an order of magnitude greater, or more than the magnetic force between the same magnet and the areas of the metal body not having the nitrogenation barrier.

The inventive subject matter described herein involves growing an oxide on the surface of a metal body (e.g., a plate of ferritic steel) to serve as a nitrogenation barrier. The oxide can be grown using electrochemical oxidation in one embodiment. Alternatively, the oxide is grown using another technique. The metal body with the nitrogenation barrier(s) is then exposed to an annealing atmosphere containing nitrogen in a nitrogenation process. The metal body can be exposed to nitrogen only during the nitrogenation process, or can be exposed to several elements or compounds that include nitrogen, such as a mixture of nitrogen ($N_2$) and hydrogen ($H_2$), but other gases could be added to the mixture (such as ammonia, $NH_4$). In one embodiment, at least one component of the annealing atmosphere used during the nitrogenation process must contain nitrogen in the chemical formula of the at least one component. For example, the metal body could be nitrogenated in a mixture of hydrogen ($H_2$) and ammonia ($NH_4$). The nitrogen is evolved from the ammonia ($NH_4$) when the mixture is heated to an elevated annealing temperature.

During this nitrogenation process, unmasked regions of the laminate metal body are converted to non-ferritic (less magnetic or non-magnetic) composition. The oxide film is thin enough that it can remain on the metal body without the need to for an unmasking step. For example, the metal body can be a plate of ferritic steel that is laminated with several other metal plates to form a laminated rotor of an electric motor. The areas of the metal plates that are converted from ferritic metal to non-ferritic metal, which means that these areas are converted from being magnetic to not being magnetic. These magnetic areas can be attracted to magnetic poles created in the stator of the motor.

The barrier layer formed by the oxide film(s) can be created by electrochemically oxidizing the areas of the metal body. The inventors of the subject matter described herein have discovered at least one electrolyte solution and set of electrochemical oxidation conditions (e.g., voltage, time, and temperature) in which the oxide films are grown to have a thickness that is sufficient to prevent converting the covered portions of the metal body from magnetic (e.g., ferritic) to non-magnetic (e.g., non-ferritic), without the oxide films being so thick that the films interfere with operation of the metal body (e.g., the oxide films do not prevent the magnetic portions of the metal plate from being magnetically attracted to magnetic poles in the stator of the motor). The inventive process described herein can eliminate the need for masking the metal body with a high-temperature ceramic material that can be difficult to remove.

Figure 10:
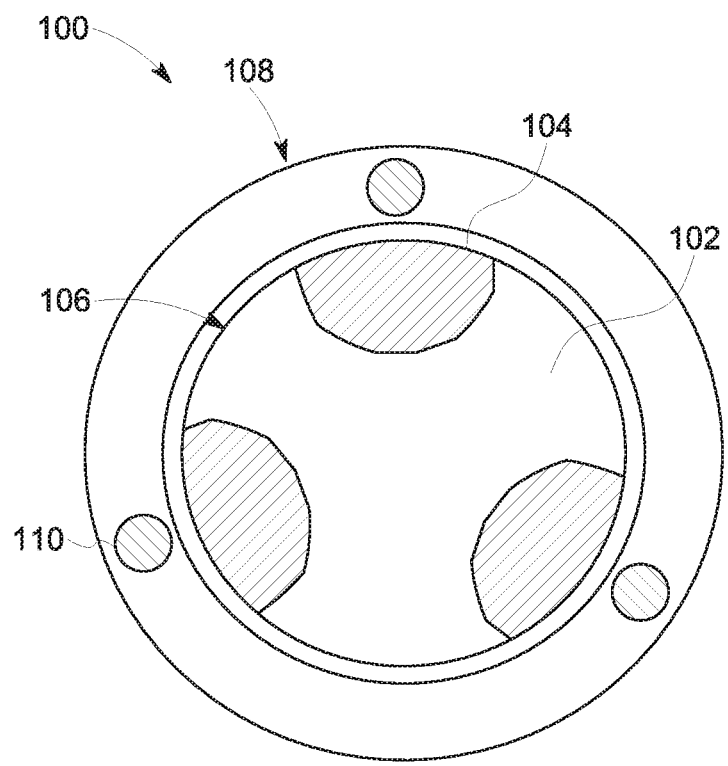
FIG. 10 schematically illustrates a machine apparatus that is at least partially formed with laminated metallic bodies having magnetic portions created using one or more embodiments of the inventive subject matter described herein.
Figure 11:
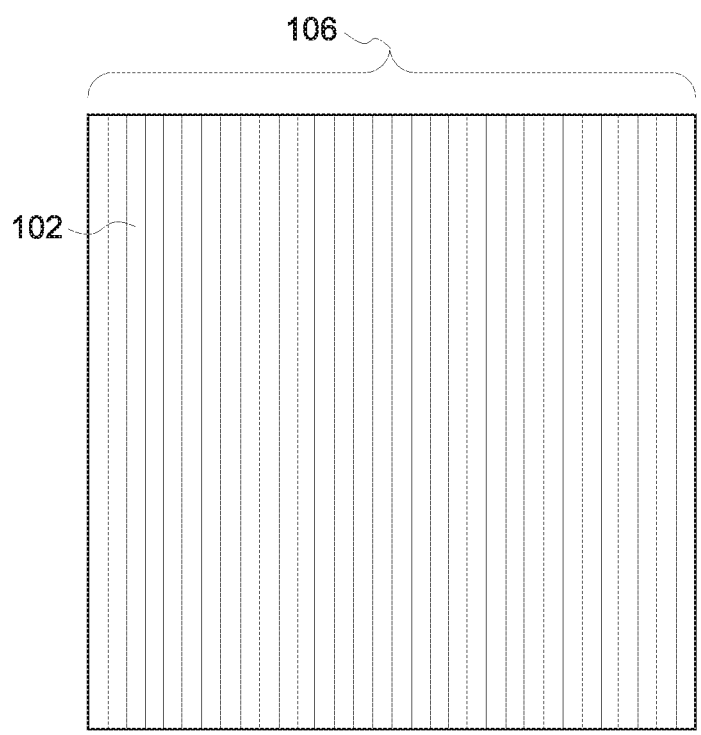
FIG. 11 schematically illustrates a side view of a rotor shown in FIG. 10.

FIG. 10 schematically illustrates a machine apparatus 100 that is at least partially formed with laminated metallic bodies 102 having magnetic portions 104 created using one or more embodiments of the inventive subject matter described herein. The illustrated machine apparatus 100 is an electric motor having a rotor 106 and a stator 108. The rotor 106 can be formed from several of the metallic bodies 102 laminated to each other. Alternatively, the rotor 106 can be formed from a single metallic body 102. FIG. 11 schematically illustrates a side view of the rotor 106 shown in FIG. 10. As shown in FIG. 11, the metallic bodies 102 are laminated together to form the rotor 106. The aspect ratio of the bodies 102 may be different from what is shown in FIG. 11.

The metallic bodies 102 have several (e.g., three) magnetic poles formed by the magnetic portions 104. The remaining portions of the metallic bodies 102 may not be magnetic. For example, the metallic bodies 102 can be formed by ferritic steel and the magnetic portions 104 are converted from the -ferritic steel to non-ferritic metal by a nitrogenation process. The stator 108 can include corresponding poles 110 that can be energized to be magnetic at different times and cause the rotor 106 to rotate within the stator 108. The motor is only one example of the machine apparatus 100 that can be formed from one or more of the metal bodies described herein. Alternatively, the machine apparatus 100 can be another device or another type of device. Not all embodiments of the inventive subject matter are limited to creating metal plates for laminating together to form a motor or part of a motor.

Figure 12:
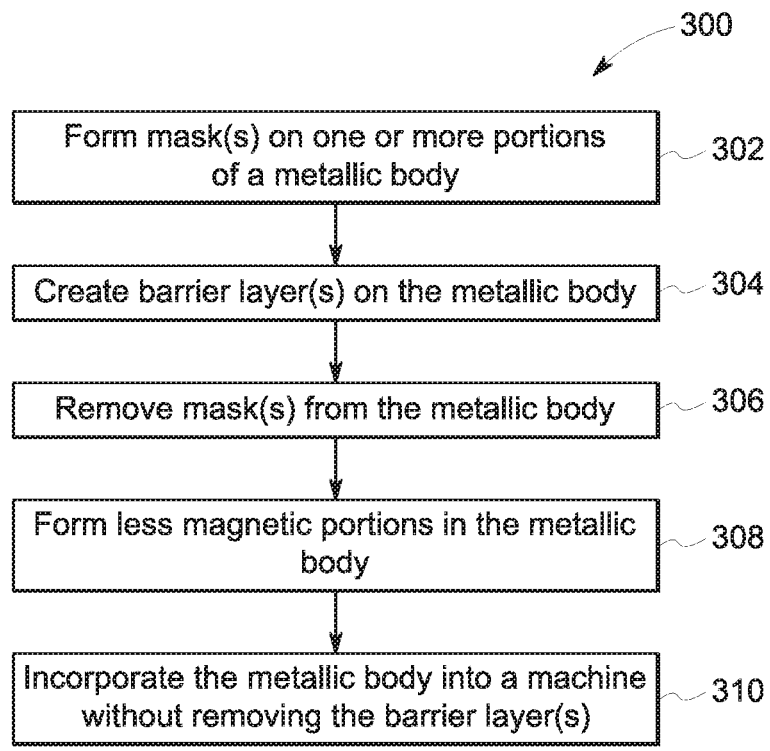
FIG. 12 illustrates a flowchart of one embodiment of a method for forming a nitrogenation barrier.

FIG. 12 illustrates a flowchart of one embodiment of a method 300 for forming a nitrogenation barrier. The method 300 can be used to create a nitrogenation barrier on the metallic bodies 102 and optionally to form the non-magnetic portions in the metallic bodies 102. At 302, one or more masks are formed on portions of a metallic, magnetic body. For example, a mask can be deposited or grown on areas of an outer surface of an ferritic steel plate that is one of the metallic bodies 102. The masks can be positioned on locations of the metallic body 102 that are to be converted to a non-ferritic composition or are otherwise not converted into a magnetic material.

Figure 13:
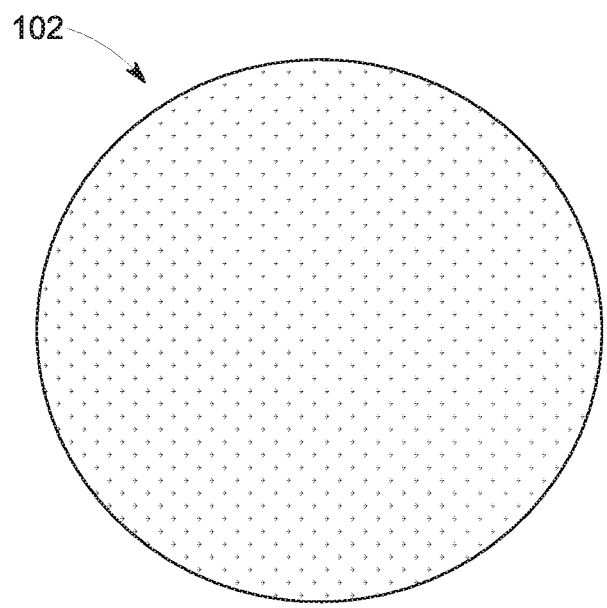
FIG. 13 schematically illustrates a top view of one embodiment of a metallic body shown in FIG. 10 prior to creating magnetic portions in the body.

With continued reference to the flowchart of the method 300 show in FIG. 12, FIG. 13 schematically illustrates a top view of one embodiment of a metallic body 102 shown in FIG. 10 prior to creating the non-magnetic portions in the body 102. The metallic body 102 can be a metal or metal alloy plate that is larger in two dimensions than in a third dimension (e.g., a flat plate). The metallic body 102 is formed from a metal or metal alloy that is metallic and magnetic. For example, the crystal structure of the metal or metal alloy in the metallic body 102 may be ferritic. As shown by the crosshatching that is consistent over all of the metallic body 102, the entire metallic body 102 is formed from the magnetic material such that any part of the metallic body 102 is attracted to any magnet.

Figure 14:
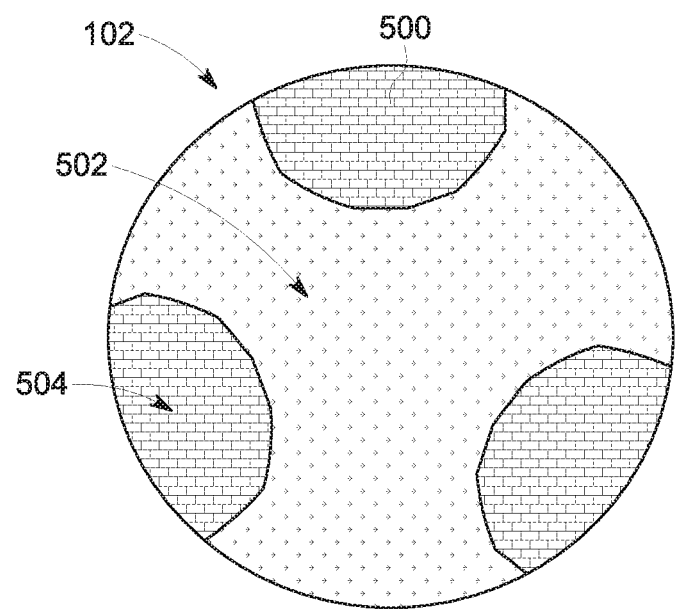
FIG. 14 schematically illustrates a top view of one embodiment of the metallic body shown in FIG. 10 with a mask deposited on the metallic body.

FIG. 14 schematically illustrates a top view of one embodiment of the metallic body 102 with a mask 500 deposited on the metallic body 102. The mask 500 is the mask applied to the metallic body 102 at 302 in the flowchart of the method 300 shown in FIG. 12. The mask 500 can be formed from one or more materials that are not ceramic materials. For example, the mask 500 can be formed from a photoresist or another polymer. The mask 500 is deposited on the metallic body 102 such that one or more protected portions or areas 502 are left exposed. As described herein, the mask 500 is positioned on the metallic body 102 to leave the protected portion(s) 502 exposed so that a barrier layer is subsequently grown on the protected portion(s) 502. This barrier layer prevents the ingress of nitrogen into the metallic layer 102 in the protected portion(s) 502, thereby preventing the protected portion(s) 502 of the metallic layer 102 from being converted to a non-ferritic or non-magnetic material. The protected portions 502 are left exposed by depositing the mask 500 on the areas of the body 102 that do not include the protected portions 502 or by removing the mask 500 in those areas. The portions of the metallic body 102 that are not covered by the mask 500 can be referred to as unprotected portions 504 of the metallic body 102.

At 304 in the flowchart of the method 300 shown in FIG. 12, one or more barrier layers are formed on the metallic body. The barrier layer can be formed on the unprotected portions 504 of the metallic body 102. Optionally, the barrier layer also can be formed on the protected portions 502 of the metallic body 102, with the portion of the barrier layer that is on the mask 500 in the protected portions 502 being removed when the mask 500 is removed from the metallic body 102. The barrier layer can be formed on the metallic body 102 even if the mask 500 is between the metallic body 102 and the barrier layer in certain areas of the metallic body 102 since the mask 500 interconnects the barrier layer with the metallic body 102. Alternatively, the barrier layer can be formed only on the unprotected portions 504 of the metallic body 102 that are left exposed by the mask 500.

In one embodiment, the barrier layer is an anodic layer formed on at least the protected portions 502 of the metallic body 102 using electrochemical deposition. For example, the barrier layer can be an oxide layer formed using electrochemical oxidation of the protected portions 502 of the metallic body 102. Alternatively, the barrier layer can be an oxide layer formed in another manner, such as by exposing the protected portions 502 of the metallic body 102 to elevated temperatures.

Figure 15:
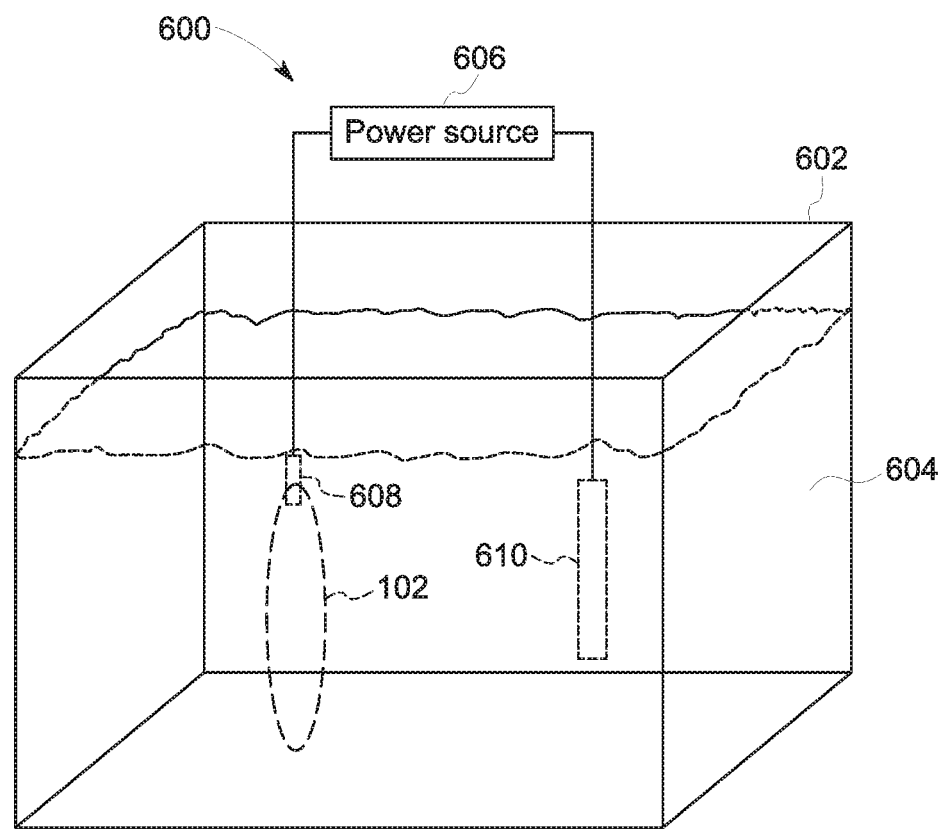
FIG. 15 schematically illustrates one embodiment of an electrochemical deposition system.

FIG. 15 schematically illustrates one embodiment of an electrochemical deposition system 600. The system 600 includes a tank or container 602 that holds an electrolyte solution 604. The entire metallic body 102 (e.g., with the mask 500, which is not visible in FIG. 15) can be immersed in the solution 604, such as by lowering all of the metallic body 102 into the solution 604. Alternatively, only part (but not all) of the metallic body 102 can be placed into the solution 604, such as by only dipping the part of the metallic body 102 that includes one or more of the unprotected portions 504 of the metallic body 102.

The metallic body 102 (or at least one of the unprotected portions 504 of the metallic body 102) can be conductively coupled with a positive terminal of a power source 606, such as a battery, power grid, or the like, by a connector 608 (e.g., a clamp or other coupling). The negative terminal of the power source 606 can be coupled with a cathode 610, such as another metallic body (e.g., the same material that forms the body 102, a sheet of aluminum, or the like), a surface of the tank 602, or the like.

The metallic body 102 (or at least the protected portions 502 of the metallic body 102) operates as an anode in the electrochemical oxidation process. The metallic body 102 receives positive current from the power source 606 so that the protected portions 502 of the metallic body 102 are oxidized. This oxidation of the protected portions 502 creates an oxide barrier layer on at least those protected portions 502 of the metallic body 102.

Several different settings or parameters of the system 600 can be controlled or varied to control or dictate the thickness at which the oxide layers are grown on the protected areas 502 of the metallic body 102. These settings or parameters include the contents of the electrolyte solution 604, the temperature at which the electrolyte solution 604 is held during oxidation, the amount of current applied by the power source 606, and/or the time at which the metallic body 102 is immersed in the electrolyte solution 604 and the current is applied by the power source 606.

In one embodiment, the electrolyte solution 604 includes potassium hydroxide. For example, the electrolyte solution 604 can be a 30 to 70% aqueous potassium hydroxide solution formed from 30 to 70% potassium hydroxide by weight (or, alternatively, by volume) and 70% to 30% water by weight (or, alternatively, by volume). In a preferred embodiment, the electrolyte solution 604 can be a 40 to 60% aqueous potassium hydroxide solution formed from 40 to 60% potassium hydroxide by weight (or, alternatively, by volume) and 60% to 40% water by weight (or, alternatively, by volume). In a more preferred embodiment, the electrolyte solution 604 can be a 45 to 55% aqueous potassium hydroxide solution formed from 45 to 55% potassium hydroxide by weight (or, alternatively, by volume) and 55% to 45% water by weight (or, alternatively, by volume). In an even more preferred embodiment, the electrolyte solution 604 can be a 50% aqueous potassium hydroxide solution formed from half potassium hydroxide by weight (or, alternatively, by volume) and half water by weight (or, alternatively, by volume).

In one embodiment, the solution 604 can be held at an elevated temperature, such as between 40 and 80 degrees Celsius during electrochemical oxidation of the protected areas 502. In a preferred embodiment, the solution 604 can be held at a temperature between 50 and 70 degrees Celsius during electrochemical oxidation of the protected areas 502. In a more preferred embodiment, the solution 604 can be held at a temperature between 55 and 65 degrees Celsius during electrochemical oxidation of the protected areas 502. In an even more preferred embodiment, the solution 604 can be held at a temperature of 60 degrees Celsius during electrochemical oxidation of the protected areas 502. The temperature of the solution 604 can be held at one or more of these selected temperatures using a heating element (not shown), which can be at least partially immersed in the solution 604 or in thermal contact with the tank 602 to heat the solution 604.

In one embodiment, the power source 606 applies a direct current of between 0.5 and 1.5 volts to the metallic body 102 and the cathode 610. In a preferred embodiment, the power source 606 applies a direct current of between 0.75 and 1.25 volts to the metallic body 102 and the cathode 610. In a more preferred embodiment, the power source 606 applies a direct current of one volt to the metallic body 102 and the cathode 610.

The inventors of the subject matter described herein have discovered a combination of settings or parameters of the system 600 that create an oxide barrier layer on the protected areas 502 of the metallic body 102 that is sufficiently thick to prevent diffusion of nitrogen into the metallic body 102 in the protected areas 502 (as described below), but that is thin enough to allow the protected areas 502 (that are later converted to be magnetic) to be attracted to magnets. For example, the metallic body 102 can be formed from ferritic steel that is immersed in 50% aqueous potassium hydroxide solution and electrochemically anodized at 60 degrees Celsius with one volt of direct current being applied by the power source 606 for at least five minutes but no longer than thirty minutes. This can form an oxide barrier layer on the protected areas 502 of the metallic body 102 that is approximately fifty microns to approximately 200 microns thick (e.g., within 5 to 10% of fifty to 200 microns thick). This combination of settings or parameters unexpectedly created the oxide barrier layer that is thick enough to prevent conversion of the protected portions 502 of the metallic body 102 from becoming non-magnetic, but thin enough to permit the metallic body 102 to be laminated with several other metallic bodies 102 to form a machine 100, as described above.

Returning to the description of the flowchart of the method 300 shown in FIG. 12, at 306, the mask can be removed from the metallic body after formation of the barrier layer. For example, the photoresist forming the mask 500 can be removed using a solvent or otherwise removed. Removal of the mask 500 results in the metallic body 102 having an oxide barrier layer on the protected portions 502 of the metallic body 102 and no oxide barrier layer or mask 500 on the unprotected portions 504 of the metallic body 102.

Figure 16:
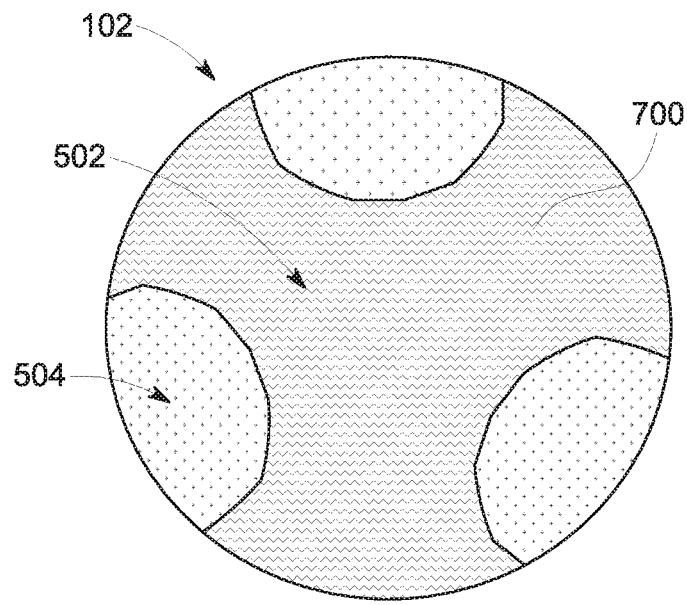
FIG. 16 schematically illustrates a top view of one embodiment of the metallic body shown in FIG. 10 with an oxide barrier layer on protected portions of the metallic body.

FIG. 16 schematically illustrates a top view of one embodiment of the metallic body 102 with an oxide barrier layer 700 on the protected portions 502 of the metallic body 102. As shown in FIG. 16, the unprotected areas 504 of the metallic body 102 have the metallic body 102 exposed while the protected areas 502 of the metallic body 102 cover the metallic body 102 with the oxide barrier layer 700.

Returning to the description of the flowchart of the method 300 shown in FIG. 12, at 308, less magnetic portions are formed in the metallic body 102. The less magnetic portions can be formed in the unprotected areas 504 of the metallic body 102. In one embodiment, the metallic body 102 with the oxide barrier layer 700 can be placed into a chamber (e.g., an oven or other sealed enclosure) that is both heated and includes an atmosphere containing nitrogen. In one embodiment, the metallic body 102 is placed into the chamber that is heated to around 1000 degrees Celsius (e.g., 950 to 1050 degrees Celsius, 975 to 1025 degrees Celsius, or 990 to 1010 degrees Celsius), with the chamber including gaseous nitrogen.

Figure 17:
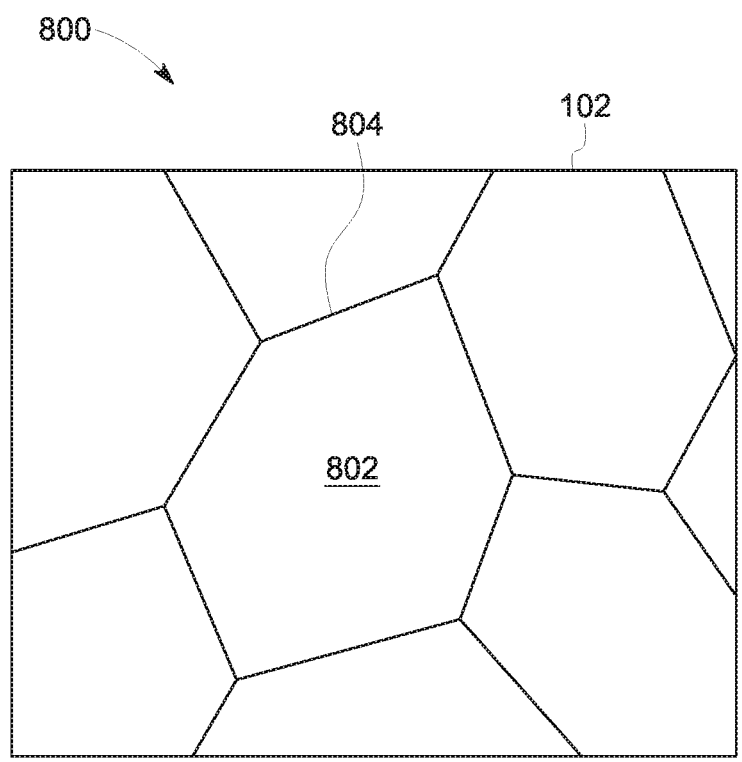
FIG. 17 illustrates an interior section of the metallic body shown in FIG. 10 during a nitrogenation process according to one embodiment of the inventive subject matter.
Figure 18:
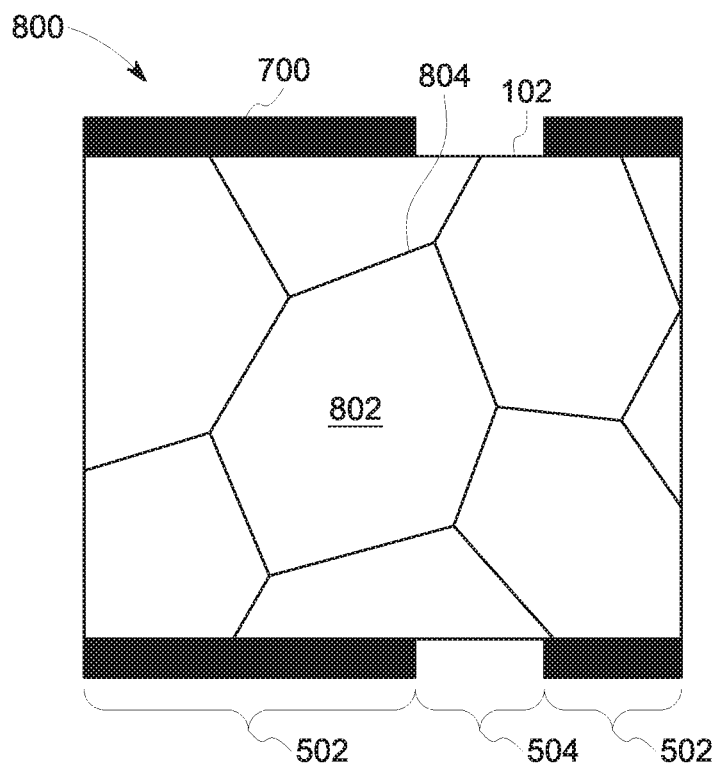
FIG. 18 also illustrates the interior section of the metallic body shown in FIG. 10 during the nitrogenation process according to one embodiment of the inventive subject matter.
Figure 19:
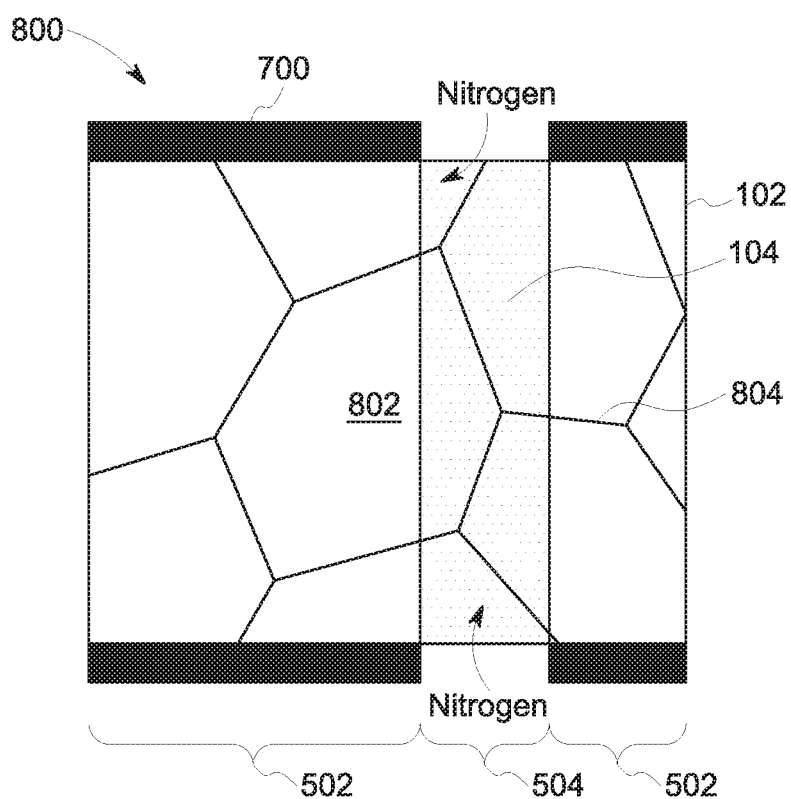
FIG. 19 also illustrates the interior section of the metallic body shown in FIG. 10 during the nitrogenation process according to one embodiment of the inventive subject matter.

The unprotected portions 504 of the metallic body 102 then undergo a nitrogenation process. During this process, nitrogen diffuses into the unprotected portions 504 of the metallic body 102 and converts these portions 504 to a less or non-magnetic material (e.g., by changing the crystalline structure of the body 102 in the portions 504 to a non-ferritic structure). The portions 504 can be less magnetic in that the magnetic force between a magnet and any of the portions 504 is less than the magnetic force between the same magnet and any protected portion or area 502 of the metallic body 102. FIGS. 17 through 19 illustrate an interior section 800 of the metallic body 102 during a nitrogenation process according to one embodiment of the inventive subject matter. As shown in FIG. 17, prior to nitrogenation, the interior section 800 of the metallic body 102 has a metallic crystalline structure formed by several grains 802 of the crystalline structure that are separated from each other by grain boundaries 804. The grains 802 may have a ferritic crystal structure prior to nitrogenation in one embodiment.

As shown in FIG. 16, the metallic body 102 now has the barrier layer 700 formed on the protected portions 502 of the metallic body 102 and no barrier layer 700 on the unprotected portions 504 of the metallic body 102. As shown in FIG. 19, exposure of the metallic body 102 to the nitrogen-containing atmosphere allows for nitrogen to diffuse into the crystalline grains 802 of the metallic body 102 in volumes or locations that are left uncovered by the barrier layer 700. The barrier layer 700 prevents the nitrogen from diffusing into the crystalline grains 802 in the volumes or locations that are covered by the barrier layer 700. Consequently, the protected portions 502 of the metallic body 102 receive little to no nitrogen, while the unprotected portions 504 of the metallic body 102 receive nitrogen. For example, the protected portions 502 may not receive enough nitrogen to convert the volumes of the metallic body 102 beneath the protected portions 502 to a less or non-ferritic structure, while the unprotected portions 504 receive enough nitrogen to convert the volumes of the metallic body 102 beneath the unprotected portions 504 to a non-ferritic structure. As a result, the protected portions 504 of the metallic body 102 are not converted to a less or non-magnetic material while the unprotected portions 504 of the metallic body 102 are converted to the less or non-magnetic material 104, as shown in FIG. 19.

Returning to the description of the flowchart of the method 300 shown in FIG. 12, at 310, the metallic body is incorporated into a machine without removing the barrier layers. The metallic body 102 can be laminated with several other metallic bodies 102. The metallic bodies 102 can be laminated together with the magnetic portions 502 of the laminated metallic bodies 102 axially aligned with each other. The laminated metallic bodies 102 can form the rotor 106 of a motor or another component of the machine. The barrier layers 700 can remain on the metallic bodies 102 as the thin layers 700 do not inhibit or interfere with the magnetism of the magnetic material in the portions 502 of the metallic body 102.

In one embodiment, the barrier layer is created over all or substantially all of the surface of the metallic body. For example, the barrier layer can be formed by electrochemically oxidizing the entire surface of the metallic body. This barrier layer can be formed without use of a mask to selectively control where the barrier layer is formed. Instead, the barrier layer is formed over all or substantially all (e.g., at least 95%) of the metallic body. The barrier layer can be formed over all or substantially all of a surface of the metallic body, such as the surface that will be laminated to another metallic body. Other surfaces (e.g., the opposite back surface and/or the edge(s) between the opposite surfaces) of the metallic body may not have the barrier layer formed thereon, or multiple or all surfaces may have the barrier layer formed thereon. The barrier layer can then be selectively removed from one or more areas of the metallic body. For example, the mask can be formed on the electrochemically oxidized barrier layer in the areas where the barrier layer is to remain. A chemical and/or mechanical etchant can then be used to remove the barrier layer from the unmasked regions (e.g., the locations where the mask is not present) to form the exposed areas of the metallic body. The exposed areas are then exposed to a nitrogen-containing atmosphere to reduce or eliminate the magnetism of the metallic body in those areas, similar to as described above.

In one embodiment, a method includes forming one or more oxide barrier layers on one or more protected portions of a magnetic, metallic body, and converting one or more unprotected portions of the magnetic, metallic body to a less magnetic material by exposing the magnetic metallic body having the one or more oxide barrier layers formed thereon to nitrogen. One or more protected portions of the magnetic, metallic body that are beneath the one or more oxide barrier layers are not converted to the less magnetic material.

Optionally, converting the one or more unprotected portions of the magnetic, metallic body to the less magnetic material results in the less magnetic material having a smaller magnetic attraction to a magnet when compared with a greater magnetic attraction between the magnet and the one or more protected portions.

Optionally, forming the one or more oxide barrier layers includes electrochemically oxidizing the one or more covered portions of the magnetic, metallic body.

Optionally, electrochemically oxidizing the one or more covered portions of the magnetic, metallic body includes immersing all of the magnetic, metallic body in a potassium hydroxide solution and applying an electric current to the magnetic, metallic body.

Optionally, the method also includes masking the one or more unprotected portions of the magnetic, metallic body by placing one or more masks on the one or more unprotected portions prior to forming the one or more oxide barrier layers.

Optionally, the method also includes removing the one or more masks from the magnetic, metallic body prior to exposing the magnetic, metallic body to the nitrogen.

Optionally, forming the one or more oxide barrier layers on the one or more protected portions of the magnetic, metallic body includes forming the one or more oxide barrier layers over all or substantially all of a surface of the magnetic, metallic body.

Optionally, the method also includes incorporating the magnetic, metallic body having the one or more unprotected portions with the less-magnetic material into a machine without removing the one or more oxide barrier layers.

Optionally, the magnetic, metallic body is a laminate sheet of an electric motor.

Optionally, the magnetic, metallic body is formed from ferritic steel.

In one embodiment, a method includes oxidizing one or more magnetic portions of a metallic body that is a magnetic body, exposing the metallic body to nitrogen such that one or more converted portions of the metallic body are converted into a less magnetic material to form a converted metallic body formed of both the one or more magnetic portions and the one or more converted portions that include the less magnetic material, and incorporating the converted metallic body into a machine without removing the one or more magnetic portions that are oxidized.

Optionally, oxidizing the one or more magnetic portions of the metallic body includes forming one or more oxide barrier layers on the one or more magnetic portions of the metallic body.

Optionally, oxidizing the one or more magnetic portions of the metallic body includes electrochemically oxidizing at least the one or more magnetic portions of the metallic body.

Optionally, oxidizing the one or more magnetic portions of the metallic body includes immersing all of the metallic body in a potassium hydroxide solution and applying an electric current to the metallic body.

Optionally, the method also includes masking the one or more converted portions of the metallic body by placing one or more masks on the one or more converted portions prior to oxidizing the one or more magnetic portions of the metallic body.

Optionally, the method also includes removing the one or more masks from the metallic body prior to exposing the metallic body to the nitrogen.

Optionally, the method also includes incorporating the metallic body having the one or more less magnetic portions with the magnetic material into a machine without removing oxidized portions of the metallic body.

Optionally, the metallic body is a laminate sheet of an electric motor.

In one embodiment, an electric motor includes one or more of a rotor or a stator formed from several metallic layers laminated with each other. The metallic layers include magnetic portions and less magnetic portions, the magnetic portions of the metallic layers including oxide layers disposed on the magnetic portions between the less magnetic portions and an adjacent metallic layer of the metallic layers.

Optionally, the oxide layers are not disposed on the magnetic portions of the metallic layers.

As used herein, an element or step recited in the singular and proceeded with the word "a" or "an" does not exclude plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   forming one or more oxide barrier layers on one or more protected portions of a magnetic, metallic body; and
   converting one or more unprotected portions of the magnetic, metallic body to a material that is less magnetic than the magnetic, metallic body by exposing the magnetic metallic body having the one or more oxide barrier layers formed thereon to nitrogen,
   wherein the method also includes masking the one or more unprotected portions of the magnetic, metallic body by placing one or more masks on the one or more unprotected portions prior to forming the one or more oxide barrier layers,
   wherein one or more protected portions of the magnetic, metallic body that are beneath the one or more oxide barrier layers are not converted to the less magnetic material.

2. The method of claim 1, wherein converting the one or more unprotected portions of the magnetic, metallic body to the less magnetic material results in the less magnetic material having a smaller magnetic attraction to a magnet when compared with a greater magnetic attraction between the magnet and the one or more protected portions.

3. The method of claim 1, wherein forming the one or more oxide barrier layers includes electrochemically oxidizing the one or more covered portions of the magnetic, metallic body.

4. The method of claim 3, wherein electrochemically oxidizing the one or more covered portions of the magnetic, metallic body includes immersing all of the magnetic, metallic body in a potassium hydroxide solution and applying an electric current to the magnetic, metallic body.

5. The method of claim 1, further comprising:
   removing the one or more masks from the magnetic, metallic body prior to exposing the magnetic, metallic body to the nitrogen.

6. The method of claim 1, wherein forming the one or more oxide barrier layers on the one or more protected portions of the magnetic, metallic body includes forming the one or more oxide barrier layers over all or substantially all of a surface of the magnetic, metallic body.

7. The method of claim 1, further comprising:
   incorporating the magnetic, metallic body having the one or more unprotected portions with the less-magnetic material into a machine without removing the one or more oxide barrier layers.

8. The method of claim 7, wherein the magnetic, metallic body is a laminate sheet of an electric motor.

9. The method of claim 1, wherein the magnetic, metallic body is formed from ferritic steel.

10. A method comprising:
    oxidizing one or more magnetic portions of a metallic body that is a magnetic body;
    exposing the metallic body to nitrogen such that one or more converted portions of the metallic body are converted into a material that is less magnetic than the metallic body before exposure of the metallic body to nitrogen to form a converted metallic body formed of both the one or more magnetic portions and the one or more converted portions that include the less magnetic material; and
    incorporating the converted metallic body into a machine without removing the one or more magnetic portions that are oxidized,
    wherein the method also includes masking the one or more converted portions of the metallic body by placing one or more masks on the one or more converted portions prior to oxidizing the one or more magnetic portions of the metallic body.

11. The method of claim 10, wherein oxidizing the one or more magnetic portions of the metallic body includes forming one or more oxide barrier layers on the one or more magnetic portions of the metallic body.

12. The method of claim 10, wherein oxidizing the one or more magnetic portions of the metallic body includes electrochemically oxidizing at least the one or more magnetic portions of the metallic body.

13. The method of claim 10, wherein oxidizing the one or more magnetic portions of the metallic body includes immersing all of the metallic body in a potassium hydroxide solution and applying an electric current to the metallic body.

14. The method of claim 10, further comprising:
    removing the one or more masks from the metallic body prior to exposing the metallic body to the nitrogen.

15. The method of claim 10, further comprising:
    incorporating the metallic body having the one or more less magnetic portions with the magnetic material into a machine without removing oxidized portions of the metallic body.

16. The method of claim 15, wherein the metallic body is a laminate sheet of an electric motor.

17. A method comprising:
    forming an oxide barrier on a first portion of a magnetic and metallic body; and
    reducing magnetism of a second portion of the magnetic and metallic body by exposing the magnetic and metallic body to nitrogen,
    wherein forming the oxide barrier layer includes electrochemically oxidizing the first portion of the magnetic and metallic body by placing the magnetic and metallic body in a potassium hydroxide solution and applying an electric current to the magnetic and metallic body, and further comprising:
    masking the second portion of the magnetic and metallic body by placing a mask on the second portion prior to forming the oxide barrier layer; and
    removing the mask from the magnetic and metallic body prior to exposing the magnetic and metallic body to the nitrogen.

* * * * *